United States Patent
Morrow

(10) Patent No.: US 10,450,736 B2
(45) Date of Patent: Oct. 22, 2019

(54) MODULAR LIGHT WEIGHT CONSTRUCTION SYSTEM BASED ON PRE-SLOTTED PANELS AND STANDARD DIMENSIONAL SPLINES

(71) Applicant: Blue Tomato LLC, Provo, UT (US)

(72) Inventor: Brian D. Morrow, Provo, UT (US)

(73) Assignee: BLUE TOMATO LLC, Provo, UT (US)

(*) Notice: Subject to any disclaimer, the term of this patent is extended or adjusted under 35 U.S.C. 154(b) by 0 days.

(21) Appl. No.: 15/987,366

(22) Filed: May 23, 2018

(65) Prior Publication Data

US 2019/0242109 A1 Aug. 8, 2019

Related U.S. Application Data

(60) Provisional application No. 62/626,542, filed on Feb. 5, 2018, provisional application No. 62/625,640, filed on Feb. 2, 2018.

(51) Int. Cl.
*E04B 1/12* (2006.01)
*E04B 1/18* (2006.01)
(Continued)

(52) U.S. Cl.
CPC .................. *E04B 1/12* (2013.01); *A01G 9/02* (2013.01); *E04B 1/18* (2013.01); *E04B 2/56* (2013.01); *E04H 1/1205* (2013.01)

(58) Field of Classification Search
CPC ..... E04B 1/12; E04B 2/56; E04B 1/18; E04H 1/1205; A01G 9/02
(Continued)

(56) References Cited

U.S. PATENT DOCUMENTS 2,202,783 A * 5/1940 Morrell ..................... E04B 2/58
52/293.3
2,321,567 A * 6/1943 Wilson .................. E04B 2/7409
52/580
(Continued)

FOREIGN PATENT DOCUMENTS

FR 2359942 2/1978
GB 2261234 5/1993
(Continued)

OTHER PUBLICATIONS

U.S. Appl. No. 15/425,756, filed Feb. 7, 2017, Morrow.
(Continued)

*Primary Examiner* — Joshua K Ihezie
(74) *Attorney, Agent, or Firm* — Workman Nydegger

(57) ABSTRACT

Modular building methods and systems using lightweight foam modular panels which are based on fractal geometry. Each panel includes one or more channels formed through the foam body, where the channels are centered between adjacent fractal modules of the overall modular panel. The channels are configured to receive splines (e.g., dimensional lumber) therein. The entire system is based on dimensional lumber sizing. The rectangular panels include a pre-cut slot extending through one face, to the channel, while a score line is formed in the opposite face, aligned with the pre-cut slot of the opposite face. The panels may be easily and quickly cut with a box knife to reduce the number of fractal modules in a given panel, to provide a smaller panel still based on such fractal geometry. Such a cut is made along the score line, where the foam is no more than 2 inches thick.

23 Claims, 27 Drawing Sheets

(51) Int. Cl.
   *A01G 9/02*  (2018.01)
   *E04H 1/12*  (2006.01)
   *E04B 2/56*  (2006.01)

(58) Field of Classification Search
   USPC ......... 52/309.7, 309.4, 309.8, 309.9, 309.12, 52/405.1
   See application file for complete search history.

(56) References Cited

U.S. PATENT DOCUMENTS

| | | | |
|---|---|---|---|
| 3,284,980 A | 11/1966 | Dinkel | |
| 3,353,315 A * | 11/1967 | Barker | E04C 2/22 428/167 |
| 3,374,703 A * | 3/1968 | Davis | E04B 1/615 411/466 |
| 3,517,468 A | 6/1970 | Woods | |
| 3,646,715 A | 3/1972 | Pope | |
| 3,699,731 A | 10/1972 | Arnold | |
| 3,775,916 A | 12/1973 | Bair | |
| 3,808,085 A | 4/1974 | Givens | |
| 4,035,972 A * | 7/1977 | Timmons | E04B 1/6145 52/241 |
| 4,435,928 A * | 3/1984 | Huling, III | E04B 1/49 52/309.4 |
| 4,443,988 A * | 4/1984 | Coutu, Sr. | E04B 1/80 52/309.2 |
| 4,578,909 A * | 4/1986 | Henley | E04B 1/74 52/210 |
| 4,578,915 A | 4/1986 | Schneller | |
| 4,615,448 A | 10/1986 | Johnstonbaugh | |
| 4,617,219 A | 10/1986 | Schupack | |
| 4,641,468 A * | 2/1987 | Slater | E04B 1/12 52/309.4 |
| 4,774,794 A * | 10/1988 | Grieb | E04B 7/225 52/309.12 |
| 4,893,451 A | 1/1990 | Valente | |
| 4,944,416 A | 7/1990 | Petersen | |
| 5,003,742 A * | 4/1991 | Dettbarn | E04B 2/707 52/282.3 |
| 5,030,502 A | 7/1991 | Teare | |
| 5,121,578 A | 6/1992 | Holz | |
| 5,138,803 A | 8/1992 | Grossen | |
| 5,172,532 A | 12/1992 | Gibbar | |
| 5,173,233 A | 12/1992 | Kafarowski | |
| 5,231,813 A * | 8/1993 | Drawdy | E04C 2/288 52/251 |
| 5,268,226 A | 12/1993 | Sweeney | |
| 5,353,560 A * | 10/1994 | Heydon | B26D 3/006 52/241 |
| 5,353,562 A * | 10/1994 | Decker | E04B 2/8629 256/31 |
| 5,377,470 A * | 1/1995 | Hebinck | E04B 1/14 52/309.12 |
| 5,390,462 A | 2/1995 | Kreiter | |
| D384,108 S | 9/1997 | Rinicella | |
| 5,694,730 A * | 12/1997 | Del Rincon | E04B 1/6154 403/298 |
| 5,803,964 A * | 9/1998 | Scarborough | E04B 1/161 106/724 |
| 5,822,940 A * | 10/1998 | Carlin | E04B 2/7453 52/479 |
| 5,899,037 A * | 5/1999 | Josey | E04B 2/58 428/118 |
| 5,901,522 A | 5/1999 | Slater | |
| 5,921,046 A * | 7/1999 | Hammond, Jr. | E04B 1/12 52/220.2 |
| 5,927,032 A * | 7/1999 | Record | E04C 2/292 52/284 |
| 5,950,389 A * | 9/1999 | Porter | E04B 1/6145 403/DIG. 15 |
| D444,577 S | 7/2001 | Neuhofer | |
| 6,305,135 B1 * | 10/2001 | Inaba | B32B 3/30 52/309.12 |
| 6,324,809 B1 * | 12/2001 | Nelson | E04F 15/02 52/309.14 |
| 6,460,302 B1 * | 10/2002 | Neuhaus, III | E04B 1/161 106/724 |
| 6,470,632 B1 | 10/2002 | Smith | |
| 6,481,172 B1 * | 11/2002 | Porter | B32B 5/18 52/506.01 |
| 6,571,523 B2 * | 6/2003 | Chambers | E04B 1/14 52/270 |
| D477,423 S | 7/2003 | Campbell | |
| 6,701,683 B2 | 3/2004 | Messenger | |
| 6,772,890 B2 | 8/2004 | Campbell | |
| 6,985,832 B2 * | 1/2006 | Saebi | E04B 1/167 52/309.12 |
| 7,028,440 B2 * | 4/2006 | Brisson | E04B 1/12 52/309.16 |
| 7,036,196 B2 | 5/2006 | Salatin | |
| 7,093,726 B1 | 8/2006 | Holztrager | |
| 7,165,374 B2 | 1/2007 | Ohanesian | |
| 7,712,265 B2 | 5/2010 | Overmyer | |
| 7,779,600 B1 * | 8/2010 | Saebi | E04B 1/161 52/309.1 |
| 8,151,539 B2 * | 4/2012 | Grinsted | E04C 2/205 52/220.2 |
| 8,220,648 B2 | 7/2012 | Barkdoll | |
| 8,468,767 B1 * | 6/2013 | McBride | E04B 1/40 52/461 |
| 8,627,625 B2 | 1/2014 | Bouchard | |
| 8,695,299 B2 * | 4/2014 | Propst | B32B 5/18 52/309.11 |
| 2005/0284060 A1 * | 12/2005 | Ritchie | E04C 2/22 52/309.7 |
| 2006/0207479 A1 | 9/2006 | Hughes | |
| 2007/0131308 A1 * | 6/2007 | Martin | B27M 1/08 144/344 |
| 2009/0100780 A1 * | 4/2009 | Mathis | E04B 1/14 52/578 |
| 2010/0011699 A1 * | 1/2010 | Weimer | E04B 2/7401 52/745.1 |
| 2010/0083590 A1 | 4/2010 | Wochnik | |
| 2010/0095625 A1 * | 4/2010 | Boutaghou | B32B 3/02 52/506.01 |
| 2010/0136269 A1 | 6/2010 | Andersen | |
| 2011/0067331 A1 * | 3/2011 | Grinsted | E04B 1/14 52/309.4 |
| 2011/0173911 A1 * | 7/2011 | Propst | B32B 3/06 52/309.13 |
| 2011/0214374 A1 | 9/2011 | Propst | |
| 2012/0011793 A1 * | 1/2012 | Clark | E04C 3/122 52/309.4 |
| 2013/0086850 A1 | 4/2013 | Morrow | |
| 2013/0216760 A1 | 8/2013 | Bol | |
| 2013/0227902 A1 * | 9/2013 | Van Sloun | E04C 2/296 52/309.4 |
| 2013/0266370 A1 | 10/2013 | Gunther | |
| 2014/0250827 A1 * | 9/2014 | Gillman | E04C 2/38 52/745.21 |
| 2015/0135634 A1 * | 5/2015 | Hoie | E04C 2/205 52/741.4 |
| 2016/0208489 A1 * | 7/2016 | Gibson | E04C 2/284 |
| 2018/0298600 A1 * | 10/2018 | Moss | E04B 1/14 |

FOREIGN PATENT DOCUMENTS

| | | |
|---|---|---|
| JP | 07-102680 | 4/1995 |
| JP | 10148095 | 6/1998 |
| JP | 2002-292612 | 10/2002 |
| KR | 10-1993-0010328 | 6/1993 |
| KR | 10-2009-0065909 | 6/2009 |
| WO | 2013052427 | 4/2013 |

OTHER PUBLICATIONS

U.S. Appl. No. 13/866,569, filed Apr. 19, 2013, Morrow.
U.S. Appl. No. 29/648,685, filed May 23, 2018, Morrow.
U.S. Appl. No. 29/658,417, filed Jul. 31, 2018, Morrow.

(56) References Cited

OTHER PUBLICATIONS

International Search Report for PCT/US2012/058344 dated Mar. 28, 2013, 3 pages.
U.S. Appl. No. 13/436,403, Feb. 13, 2013, Office Action.
U.S. Appl. No. 13/436,403, Aug. 1, 2013, Final Office Action.
U.S. Appl. No. 13/866,569, Jun. 20, 2014, Notice of Allowance.
U.S. Appl. No. 15/426,756, Feb. 23, 2018, Office Action.
U.S. Appl. No. 29/648,685, Feb. 15, 2019, Ex Parte Quayle Action.
U.S. Appl. No. 29/648,685, May 9, 2019, Notice of Allowance.

* cited by examiner

MODULAR LIGHT WEIGHT CONSTRUCTION SYSTEM BASED ON PRE-SLOTTED PANELS AND STANDARD DIMENSIONAL SPLINES

CROSS-REFERENCE TO RELATED APPLICATION

The present application claims priority to and the benefit of United States Provisional Patent Application Nos. 62/625,640 and 62/626,542 filed Feb. 2, 2018, and Feb. 5, 2018, respectively. Each of the foregoing applications is herein incorporated by reference in its entirety.

BACKGROUND OF THE INVENTION

1. The Field of the Invention

The present invention is in the field of modular building construction methods and systems used within the construction industry.

2. The Relevant Technology

Building construction systems including modular features are sometimes used in the construction field. For example, particularly in third world countries where skilled labor is not readily available, and building materials must be relatively inexpensive, cinder block or brick materials are used in constructing homes, schools, agricultural buildings, and other buildings. It can be difficult to learn to lay block or brick while keeping the walls square and plumb. In addition, such systems require mortar to hold the individual blocks or bricks together. A roof formed from a different material (other than block or brick) is needed. In addition, insulating and/or providing an air-tight seal within such structures is difficult.

Stick frame construction methods are of course also well known, although such systems also require a considerable amount of skilled labor to construct a building therefrom. In addition to requiring skilled labor, such existing methods also require considerable strength for those involved in the construction. Because of such requirements, in practice, such construction systems are not readily usable by groups of both men and women, where women often make up the vast majority of the labor pool available in third world humanitarian construction projects.

Various other building materials and systems are also used in the art. Structural insulated panels (SIPs) are used in some circumstances within the construction industry as an alternative to stick frame construction with insulation blown or laid within the cavities between stick framing members. A typical structural insulated panel may include an insulating layer sandwiched between two layers of structural plywood or oriented strand board ("OSB"). The use of such panels within residential, commercial or other construction projects can often significantly decrease the time required for construction, and also typically provides superior insulating ability as compared to a traditional structure constructed of block or brick, or even stick frame construction with insulation blown or laid between frame members. That said, drawbacks with such systems is that stick frame construction and SIP construction typically require some level of skilled labor, and thus are not particularly well suited for use in environments where such skills are not readily available, and shipping such panels can represent a significant expense. In addition, heavy equipment (e.g., cranes) are often required to install such panels.

SUMMARY

In one aspect, the present invention is directed to various building construction systems and methods. Such systems and methods may employ a plurality of modular panels, which may be based on a common modularity within a portion of each panel, itself. In other words, the system is a fractal system, in which each modular panel may geometrically include the same characteristics of a smaller "fractal module" therein. Such a system allows for easy scaling from a small to a larger size. The modularity and particular panel design of the system also allows the modular panels to be easily and quickly cut, where the building blueprints dictate the need for only a portion of the overall larger modular panel (e.g., which may include a plurality, e.g., such as 4 or 6 fractal modules). Such modularity and fractal characteristics will be apparent, in the following disclosure.

Furthermore, many existing systems provide excellent flexibility, but with that flexibility, there is significant room for error, such that skilled labor is required. Other systems that may employ a system of panels may reduce the room for error, but greatly reduce the available flexibility, necessitating use of many custom components and solutions to accommodate needs that the system does not anticipate. Because the present system is based on fractal geometry, it provides a happy medium between providing flexibility, and requiring only little if any skilled labor.

A modular panel for use in construction may include a lightweight (e.g., foam) body, and a plurality of channels extending through a length or width of the panel. Each channel is configured in size and shape to receive a spline therein. When the spline is received into the channel, the spline is disposed within the foam body of the panel, without the spline being exposed on an outside face of the foam body, so that the spline is restrained in a particular position once received within the channel.

One advantage of the present system is that the splines may simply be dimensional lumber, which is readily available throughout nearly the entire world. That said, it is not necessary that the splines be formed of wood, and it will be apparent that metal or other splines (e.g., steel or aluminum studs) are of course also usable, e.g., where it may be desirable to avoid the use of wood. Any other conceivable material (e.g., concrete, recycled plastic splines, etc.) may also be used for such spline, as will be apparent from the present disclosure.

The panels may include a pre-cut slot in a first face of the modular panel, centered on the channel, where the pre-cut slot extends through the thickness of the foam at the first face of the panel, into the channel. In other words, such a narrow pre-cut slot may provide access into the channel from one exterior face of the panel. The width of such a pre-cut slot may be relatively thin, to ensure that the spline remains restrained in the channel. For example, such a pre-cut slot may be no more than 0.25 inch, or 0.125 inch wide, e.g., less than 20%, less than 15%, less than 10%, or less than 5% of the transverse cross-sectional length of the channel.

On the opposite face of the modular panel, the channels may not include such a pre-cut slot, but may include a score line (e.g., recessed groove) that is aligned with the pre-cut slot on the opposite panel face. In other words, the score line may also be centrally aligned with the width of the channel, but on the opposite face of the panel. When it becomes necessary to cut a modular panel (e.g., where a wall being built requires only a portion of the length of such a "full" panel), this is easily accomplished by cutting the panel at the score line. It is easy to cut through the panel at the score line, because the foam thickness of the panel at the location of the score line no more than 2 inches, which can easily be cut through with a box cutter. Cutting of thicker foam thicknesses (e.g., particularly 6 inches or more is very difficult, as the blade of a reciprocating saw wanders as it cuts, making such cuts performed on the job site impractical, and inaccurate.

The ability to cut the foam panel to be of a shorter length or width (i.e., to include fewer fractal modules) by simply and quickly running a box cutter through the foam thickness at the score line is of great practical advantage as compared to other building systems that may provide for foam thicknesses in excess of 4 or 5 inches, but are difficult to quickly and accurately cut at such a job site, using portable tools that are easily accessible.

The panels themselves are cut on a CNC controlled hot wire cutting device, which is capable of making very precise cuts, so that the panels themselves are very accurate in their geometry (e.g., to within 0.001 inch). Thus, the panels may be of any desired thickness, e.g., as dictated by the particular dimensional splines employed, and the desired wall thickness. For example, a foam panel thickness of 5.5 inches may be equal in width to a 2×6 (which is actually 5.5 inches wide, rather than 6 inches wide). Such a foam panel may include channels cut with the CNC device that are sized to accept 2×4 dimensional splines (e.g., 2×4 studs, or 2×4 metal studs). It will be appreciated that where a thicker foam insulating wall is desired, the foam panels could be cut to correspond to 2×8 dimensions, or some other dimensional lumber values. By way of further example, a 2×8 thickness foam panel may be 7.5 inches thick, and the channels cut therein could be sized to receive 2×6 dimensional splines.

The present disclosure also relates to wall systems, as well as methods of construction that use modular panels such as those described herein. For example, such a wall system may include a plurality of modular panels such as those described herein, where each panel includes a lightweight (e.g., foam) body, and a plurality of channels extending through the length or width of the panel, where each channel is configured in size and shape to receive a spline therein, where the spline geometry is based on the dimensions of dimensional lumber (or other standard dimensional material). The modular panels are typically of a size such that they will not provide the entire height of a typical wall or room being constructed, but it will typically be required to stack such panels one on top of another. As such, the splines are longer than the length of the channel they are received in, so that they span a length that is greater than that of a channel of a single modular panel (i.e., channels of one panel are aligned with channels of an adjacent panel).

Another advantage of the present systems is that because the splines are restricted to movement within a single degree of freedom (only along the longitudinal direction of the channel—either up or down, or left to right), it is not necessary that the splines inserted into a given channel be of a single, unitary piece of spline material. For example, scraps of short 2×4s or other spline materials may be dropped or otherwise pushed into the channels, to make up the needed spline length. Such ability reduces on site construction waste, as such small spline lengths may be simply dropped sequentially into the channel, forming the needed spline. There is typically no need to even attach such small spline segments together, although they could be attached to one another (e.g., glued, nailed, screwed, or the like) if desired. For example, they may simply become trapped in the channel of the panel, between top and bottom cap plates of the wall. Such cap plates may also be of dimensional lumber, or other standard dimensional material.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The drawings illustrate several embodiments of the invention, wherein identical reference numerals refer to identical or similar elements or features in different views or embodiments shown in the drawings.

FIG. 3C is an isometric view showing the smallest fractal module that can be cut from the panel of FIG. 1, and from which fractal module all of the larger modular panels are formed from.

DETAILED DESCRIPTION OF THE PREFERRED EMBODIMENTS

I. Definitions

Figure 1:
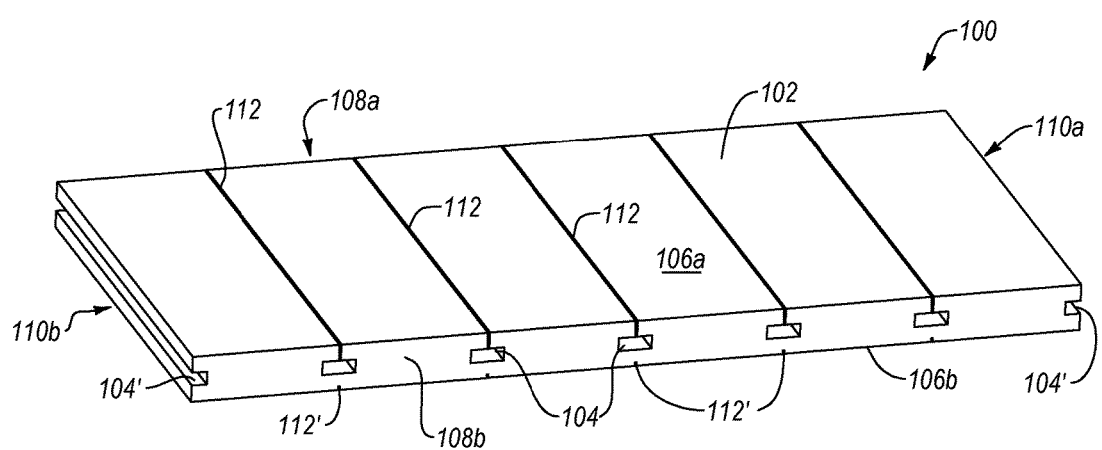
FIG. 1 is an isometric view of an exemplary modular panel as described herein.

Some ranges may be disclosed herein. Additional ranges may be defined between any values disclosed herein as being exemplary of a particular parameter. All such ranges are contemplated and within the scope of the present disclosure.

Numbers, percentages, ratios, or other values stated herein may include that value, and also other values that are about or approximately the stated value, as would be appreciated by one of ordinary skill in the art. A stated value should therefore be interpreted broadly enough to encompass values that are at least close enough to the stated value to perform a desired function or achieve a desired result, and/or values that round to the stated value. The stated values include at least the variation to be expected in a typical manufacturing process, and may include values that are within 10%, within 5%, within 1%, etc. of a stated value. Furthermore, the terms "substantially", "similarly", "about" or "approximately" as used herein represent an amount or state close to the stated amount or state that still performs a desired function or achieves a desired result. For example, the term "substantially" "about" or "approximately" may refer to an amount that is within 10% of, within 5% of, or within 1% of, a stated amount or value.

All numbers used in the specification and claims are to be understood as being modified in all instances by the term "about", unless otherwise indicated. Notwithstanding that the numerical ranges and parameters setting forth the broad scope of the subject matter presented herein are approximations, the numerical values set forth in the specific examples are reported as precisely as possible. Any numerical value, however, inherently contains certain errors necessarily resulting from the standard deviation found in their respective testing measurements.

It must be noted that, as used in this specification and the appended claims, the singular forms "a," "an" and "the" include plural referents unless the content clearly dictates otherwise.

All publications, patents and patent applications cited herein, whether supra or infra, are hereby incorporated by reference in their entirety to the same extent as if each individual publication, patent or patent application was specifically and individually indicated to be incorporated by reference.

II. Introduction

In one embodiment, the present invention is directed to modular building methods and systems where the building is constructed using lightweight foam modular panels which are based on fractal geometry (i.e., they are made up of one or more fractal module units having the same geometry), in which the panels include one or more channels formed through the lightweight foam body of the panel, where the channels are centered between adjacent fractal modules of the overall modular panel. The channels are configured to receive studs or other splines, which may simply be dimensional lumber, or other studs or splines having such standard dimensions. While the term "dimensional lumber" may be used herein for convenience, it will be appreciated that such splines do not necessary need to be formed of wood, such that metal studs, other metal splines, or even other materials (concrete, or otherwise) could be used. Such other materials may have the same standard dimensions associated with dimensional lumber (e.g., 2×4s, 2×6s, 2×8s, 2×10s, 2×12, and the like).

Furthermore, the modular panels may have a thickness (e.g., foam thickness) that is greater than 4 inches, although in order to cut a modular panel, a user is typically never required to make a cut that is more than 2 inches deep through the foam. For example, a typical modular panel may be 5.5 inches thick, the same width as a 2×6, but may be geometrically configured so that in order to separate one or more fractal modules from the panel, no cuts greater than 2 inches in depth are required. Such a characteristic provides an enormous practical advantage, as foam thicknesses far greater than 2 inches are required in order to provide sufficient insulative R-value to a building being constructed, yet it is time consuming, frustrating, difficult, and accuracy is impossible as a practical matter when attempting to cut through a foam thickness of more than a few inches (e.g., more than 2, more than 3, or more than 4) using tools available at the job site (e.g., such as a reciprocating blade). The present foam panels can easily be cut with a single hand, using a simple box cutter, to reduce a given foam panel from a given number of fractal modules (e.g., 6 fractal modules in one typical 4 foot by 8 foot exemplary panel with channels on 16 inch centers) to any smaller number of fractal modules.

Furthermore, because the modular panels can be formed on a CNC hot wire cutting device, any needed deep cuts can be formed there, during manufacture, where high precision and accuracy are possible. Furthermore, by cutting the panels on such a CNC device, the rectangular panels themselves can be formed to very high precision and accuracy dimensions. For example, a 4 foot by 8 foot panel, 5.5 inches thick will be perfectly "square" and plumb, allowing the panel itself to be used as a square, level, or jig. This characteristic greatly reduces the need for skilled labor, as the panel itself serves as a template (i.e., no tape measure is needed). This helps to ensure a robust composite structure having the proper geometry (e.g., right angled walls where such is desired, level floors, level ceilings, and the like).

The present methods and systems of assembly allow for relatively open source construction, with a relatively high degree of customizability to the building being constructed, all achievable at lower cost and/or time as compared to existing methods of construction. Furthermore, even with such relative flexibility, little if any skilled labor is required. For example, a model or blueprint image of the building to be constructed could simply be provided, with the crew only being required to connect the modules as shown in the model or blueprint.

It is also advantageous that the foam material (e.g., expanded polystyrene) from which the modular panels are constructed may be readily available nearly anywhere, such that the foam panels may be manufactured at a foam production facility near the construction site (minimizing shipping distance and expense). This provides savings and convenience in that the foam panels can be manufactured locally, avoiding the significant expense of shipping foam (which occupies a large volume, even though it weights little).

For example, such foam may typically have a density from about 1 lb/ft$^3$ to 2 lb/ft$^3$, and provide an insulative value of about R4 per inch of foam thickness. A wall constructed using a 5.5 inch thick foam panel as described herein may provide an R value of about R25.

III. Exemplary Construction Methods and Systems

FIG. 1 shows a modular panel 100 according to the present invention. Such panels can be used in building construction, and advantageously are typically fully compatible with existing building codes and standard construction practices, such that adoption of such a building system would not present the many regulatory and other hurdles associated with various other construction systems that have been proposed, some by the present Applicant. For example, the modular panel and construction system is fully compatible with 16 inch on center stud spacing (or 24 inch on center for some applications), and the like.

Modular panel 100 includes a lightweight body 102. Body 102 may comprise or otherwise be formed from a foam material, such as expanded polystyrene (EPS) foam. Such material may be rigid. Such panels may be precision cut from blocks of rigid, already cured EPS foam. For example, EPS foam is often available as 3×4×8 foot blocks. Such a block may be sufficient to produce 6 modular panels as shown in FIG. 1, which may also measure 4×8 feet, with a thickness of 5.5 inches. While EPS foam may be particularly appropriate, other lightweight materials that can be molded (as the 3×4×8 foot EPS blocks are molded), easily cut using CNC hot wire cutting device, etc. may also be used.

Each panel 100 includes one or more (e.g., a plurality of) channels 104 extending through either a length or a width of panel 100. In the illustrated configuration of FIG. 1, channels 104 extend vertically, through the width of panel 100. Each channel is advantageously sized and shaped (e.g., in transverse cross-section) to receive a spline 116 (e.g., a stud) therein. Such splines may include cross-sectional dimensions based on readily available dimensional lumber (e.g., a standard 2×4). Such dimensional lumber is available in various lengths (e.g., 8 feet, 10 feet, 20 feet, and the like).

In illustrated panel 100, channels 104 are disposed through a center of the thickness of foam body 102, without any of the channel 104 being open at faces 106a and 106b of panel 100. Channels 104 are shown opening into the top end 108a and bottom end 108b. Channels 104 within the center of panel 104 have dimensions just slightly larger than those of a 2×4 or other dimensional lumber spline so as to not bind within the channel, but so as to be freely slidable therein (e.g., a clearance of 1/16 inch or so, as will be apparent to those of skill in the art, may be provided). FIG. 1 also illustrates the presence of half-size channels 104' at ends 110a and 110b of panel 100. Such half-size channels are similar to channels 104, but are intended to accommodate splines that run through the half-size channel, and another half-size channel of an adjacent panel 100.

The channels may be spaced apart from one another to accommodate any particular spacing of the studs or other splines (e.g., 16 inch centers, 24 inch centers, or the like). Such spacing characteristics are well accepted within the building industry, which allows the present panels and systems to be readily accepted and implemented, once made known by Applicant. Importantly, when a spline is received into any of the channels, the spline is not exposed on either exterior face 106a or 106b of panel 100. Applicant has found that other systems that provide for structural members or other features that are exposed on the exterior of a panel exhibit a "ghosting" problem, in that even once such structures are finished over, because of the different material characteristics underlying drywall or other sheathing associated with such surface exposure at the face during framing, there is a noticeable "ghost" that shows up through paint or other interior or exterior wall finishes that plague such systems. It is thus important that no such spline surface exposure is provided with the present panels.

In addition to "ghosting" issues, exposure of splines on the exterior surface also can result in thermal bridging problems, e.g., particularly where metal sheathing is present (e.g., on a roof or otherwise). By ensuring that the splines are positioned internally, rather than externally exposed, there is less of a problem of thermal bridging through the wall, which increases overall insulative efficiency of the wall, roof or other building structure constructed therefrom. Where thermal bridging occurs, undesired condensation can often occur in such spots due to a thermal gradient associated with such thermal bridging. The present systems ensure there is a thermal break between such structural spline members and any metal or other sheathing that is eventually placed over roofs, walls, or the like.

Furthermore, because the splines are centered in the panel thickness, with approximately 2 inches of foam thickness on either side of the spline, building codes do not require that electrical wiring (e.g., 120V) be run within conduit, as there is at least 1.5 inches between the exterior of any sheathing (e.g., drywall or the like) applied over the panel and such electrical wiring. Even if the channels and splines are rotated 90° from the orientation shown, there would still be a 1 inch foam thickness on either side of the spline, so that once sheathing is applied over the panel, there is at least or more than 1.5 inches between the exterior of such sheathing and the wiring (e.g., wiring placed against the spline in the channel).

Figure 16:
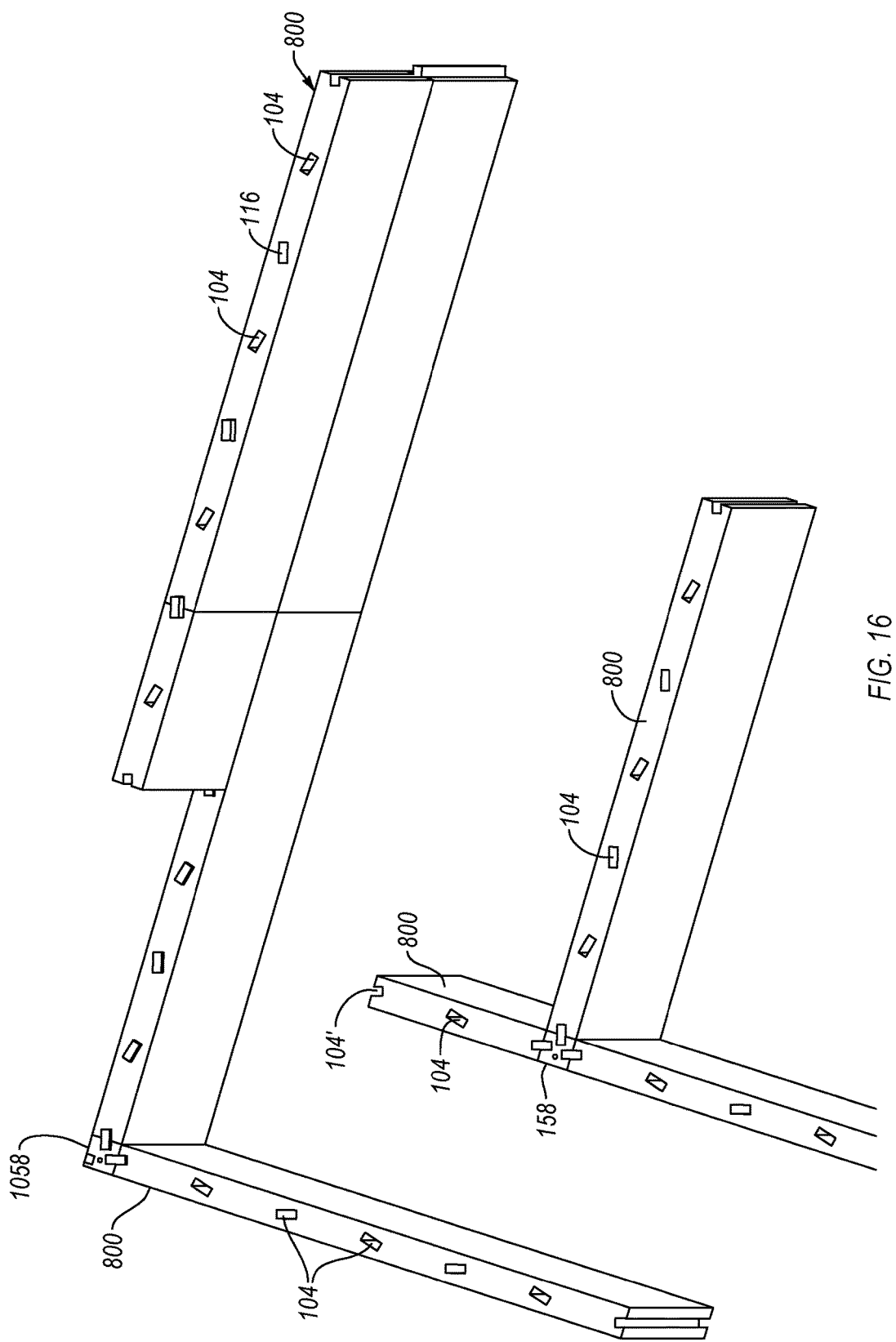
FIG. 16 shows how the channels of the modular panels may be angled so that the faces of the splines are not parallel (or perpendicular) to the faces of the modular panel. Such angling increases resistance to buckling. While principally shown where the channels are oriented parallel to the faces of the panel, the channels could alternatively be oriented perpendicular to the faces of the panel (as shown in the roof panel of FIG. 10).

By way of further explanation, in FIG. 1, channels 104, 104' are shown to be oriented so that the length of the transverse cross-section (i.e., the width of the spline) is oriented parallel to the faces 106a, 106b of panel 100. In another embodiment, an orientation that is rotated 90° may be used (e.g., the width of the transverse cross-section (i.e., the depth of the spline) is parallel to faces 106a, 106b of panel 100. FIG. 16 described hereafter shows another alternative with a slight angulation of the channel away from the orientation of FIG. 1. While channels 104, 104' are shown centered within the thickness of the panel 100, it will be appreciated that in another embodiment, the channels could be offset towards one of the two faces 106a, 106b of the foam body 102. That said, a centered configuration may be preferred, as offsetting may require use of different length fasteners to attach sheathing on one face of the panel versus the other face.

In any case, when attaching such drywall, or other sheathing the present system avoids point loading onto screws, nails, or other fasteners employed, because of the foam thickness (e.g., 2 inches) between the sheathing and the spline encased within the foam panel. Such avoidance of point loading can be beneficial in an earthquake or the like, which may otherwise cause such fasteners to shear off.

In addition to channels 104, 104', the panel 100 further includes a pre-cut slot 112 in face 106a of panel 100, centered relative to each channel 104. Pre-cut slot 112 extends from first face 106a into channel 104. For example, such a pre-cut slot allows internal formation of channel 104 in body 102 with a CNC controlled hot wire cutter. The width of slot 112 is advantageously very narrow, e.g., rather than providing a wide opening from channel 104 to the area adjacent face 106a. For example, where the length of channel 104 may be 3.5 inches (e.g., to accommodate a 2×4 spline), the width of slot 112 (the width of which is parallel thereto) may be no more than 0.25 inch, or no more than 0.125 inch. Stated another way, the width of slot 112 may be no more than 20% of, 15% of, 10% of, or no more than 5% of the transverse cross-sectional length of channel 104.

On the face 106b, opposite face 106a with pre-cut slots 112, there are shown score lines 112'. Such score lines may be configured as grooves, forming a recess into face 106b, but are not so deep as to penetrate into channel 104. As shown, the score lines 112' are aligned with slots 112, so that each indicates the center of channel 104. By way of example, the depth of such score lines may be from about 0.0625 inch to 0.25 inch deep. Such alignment with channel 104 is beneficial once a wall structure has been built, where the panels are vertically oriented, and the channels may no longer be visible. The slots 112 and score lines 112' are visible in such circumstances, allowing a user to quickly and easily see where the splines 116 are located within a given wall structure. Such slots 112 and score lines 112' make attachment of drywall or other sheathing over the foam panels very easy, as the slots 112 and score lines 112' mark the location of the splines, which are easily nailed or screwed into, through the thickness of the foam between channel 104 and each respective face 106a, 106b.

Furthermore, the score line 112' facilitates easy cutting of the modular panel 100 along line 112', should it be desired to remove one or more of the fractal modules from such a panel 100. For example, the foam thickness along score line 112' (from face 106b to channel 104) is 2 inches or less. Such a thin dimension is easily and quickly cut using a box knife, which tool will be readily familiar to those of skill in the art. This 2 inch thickness is at the same time sufficient to ensure the integrity of the modular panel, so that it does not crack or break, inadvertently. The ability to easily and quickly cut one or more fractal modules from the panel is particularly advantageous, as cutting foam which is significantly thicker than 2 inches is difficult with portable tools that are typically available at a construction site. For example, thicknesses of 4 inches, 6 inches, or 8 inches of foam can be cut e.g., with a reciprocating blade, but such cuts are imprecise, as the blade tends to wander as it cuts through such wide foam thicknesses. In addition, such deep cuts are far more tedious, time consuming and frustrating to achieve.

As described herein, each modular panel is advantageously made up of one or more fractal modules which are included within the modular panel. FIG. 1 identifies one such fractal module 114 within panel 100. Panel 100 is shown as including 6 fractal modules included therein, where each fractal module includes a half-size channel 104' at each end thereof. The boundary between adjacent fractal modules is marked by pre-cut slot 112 and score line 112'. In the illustrated embodiment, the panel may measure 4 feet by 8 feet, where each of the 6 fractal modules measures 4 feet by 16 inches. It will be appreciated that different spline spacing (e.g., 24 inches versus 16 inches) would result in a 4 foot by 8 foot module that includes 4 fractal modules, where each fractal module measures 4 feet by 24 inches. In other words, the width dimension of the fractal module 114 is identical to the spacing of the channels and splines (e.g., 16 inches on center, 24 inches on center, or any other selected value). Such selected spacing may depend on the particular building code to which the building is being constructed. For example, while 16 or 24 inch spacing may be typical in the United States and some other regions, it will be apparent that the modular panels may be adapted to accommodate any desired channel and spline spacing, in which a whole number of fractal modules are included within a given modular panel (e.g., 4 fractal modules, 6 fractal modules, or the like).

Figure 2:
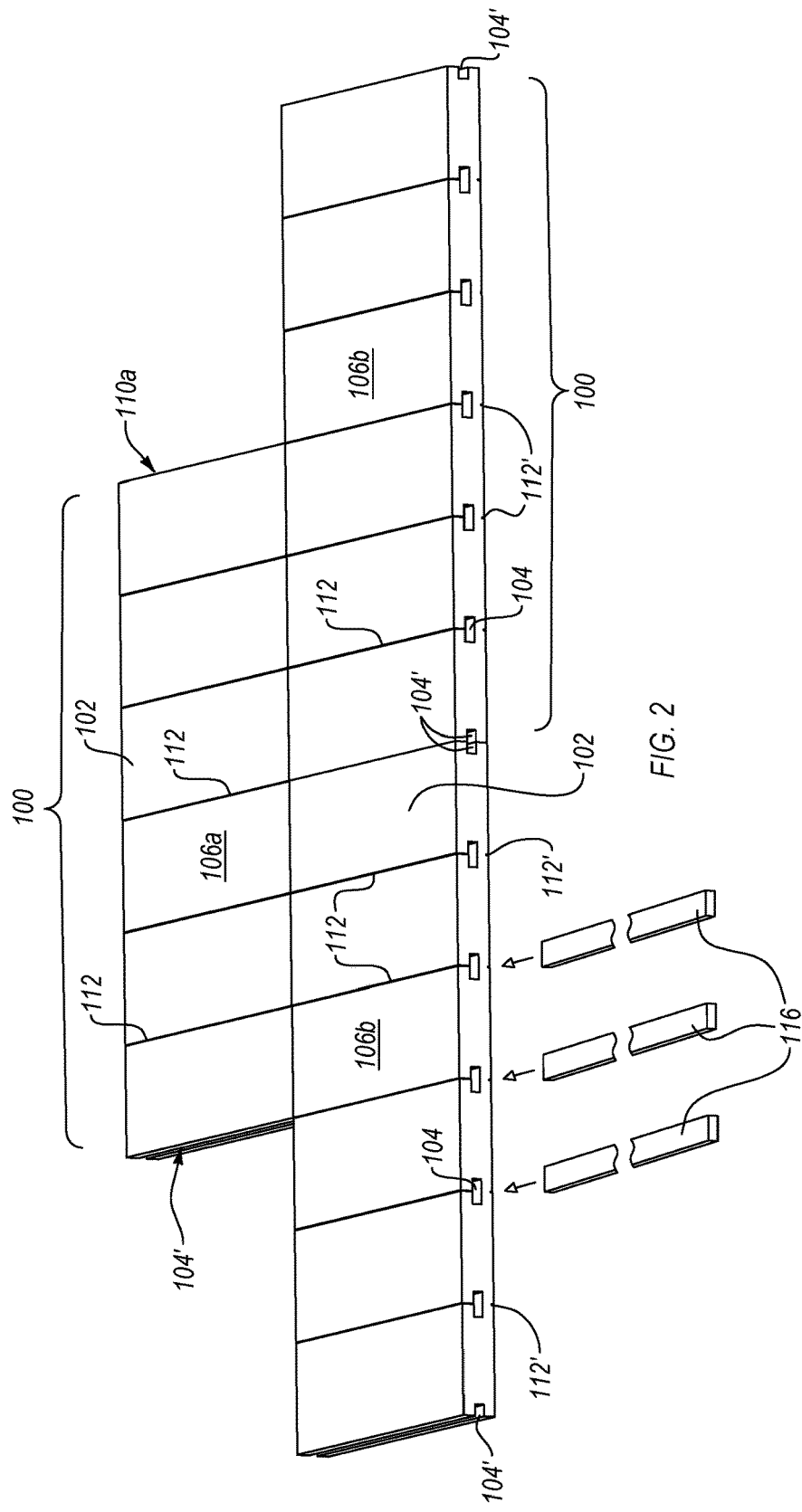
FIG. 2 is an isometric view showing placement of a plurality of the modular panels of FIG. 1, along with accompanying splines, for construction of a wall.

FIG. 2 shows a plurality of modular panels 100 in which channels 104 of one panel are aligned with the channels 104 of another panel, for making a wall structure. As shown in FIG. 2, a typical wall may include 2 or more panels stacked one on top of another, where the seams between one panel and the next panel are staggered, as shown. For example, the illustrated wall may be 2 panels wide, and 2 panels high (e.g., 16 feet long, 8 feet high). One row may simply include two panels, end to end. The other row may include a full panel (i.e., 6 fractal modules) in the center, with half-size panels (e.g., formed by simply cutting a full panel 100 down score line 112' in the middle), each with 3 fractal modules, on either side of the full panel. Such a configuration staggers the seams between panels from one row to the next.

The various panels (or fractional panels, including some lesser number of fractal modules than a full panel) are aligned with one another, as shown in FIG. 2, and the splines may then be inserted therein. As shown, each panel may typically have a dimension which becomes the "height" of the wall which is less than that of the wall, so that more than one row of such panels may be aligned, and a spline inserted into the channel may aid in aligning and/or holding the two panels together in the desired arrangement. Even where dimensional lumber may typically include some variability in warpage characteristics, the channels may actually aid in forcing such warped lumber to assume the nominal, desired unwarped configuration. The channels 104 may of course be sized to be somewhat larger than the dimensional lumber spline, so as to allow the spline to be easily inserted into the channel, but at the same time, allowing the spline to be frictionally held therein, absent any other applied force (other than gravity). In other words, the splines can be easily advanced through the channels 104, but once inserted therein, are retained so that they do not simply fall out on their own.

If desired, the splines may be more securely retained within channels 104 (and 104') with any suitable adhesive. Without use of such an adhesive, the building system may actually be reversible, allowing dis-assembly of the components in a way that allows them to easily and quickly be re-assembled, e.g., at a different time, or in a different location. Such characteristics may be particularly beneficial for temporary structures (e.g., emergency housing, sets for plays or other drama productions, and the like). Where an adhesive is used, such adhesive may be injected into channel 104 through pre-cut slot 112.

Once drywall or other sheathing is placed over the foam panels 100, nails or screws may further be used to secure such sheathing to the splines within channels 104, 104'.

As is apparent from FIG. 2, the splines may have a length that is greater than the length of a given modular panel, such that a single spline runs through aligned channels of more than one modular panel. In addition, FIG. 2 shows how once the splines are inserted into the channels 104, splines disposed therein are not exposed on the outside faces 106a, 106b of the foam bodies of panels 100. The splines are constrained within channels 104, having only 1 degree of freedom therein (i.e., the ability to move up and down (or side to side) within channel 104).

Figure 3A:
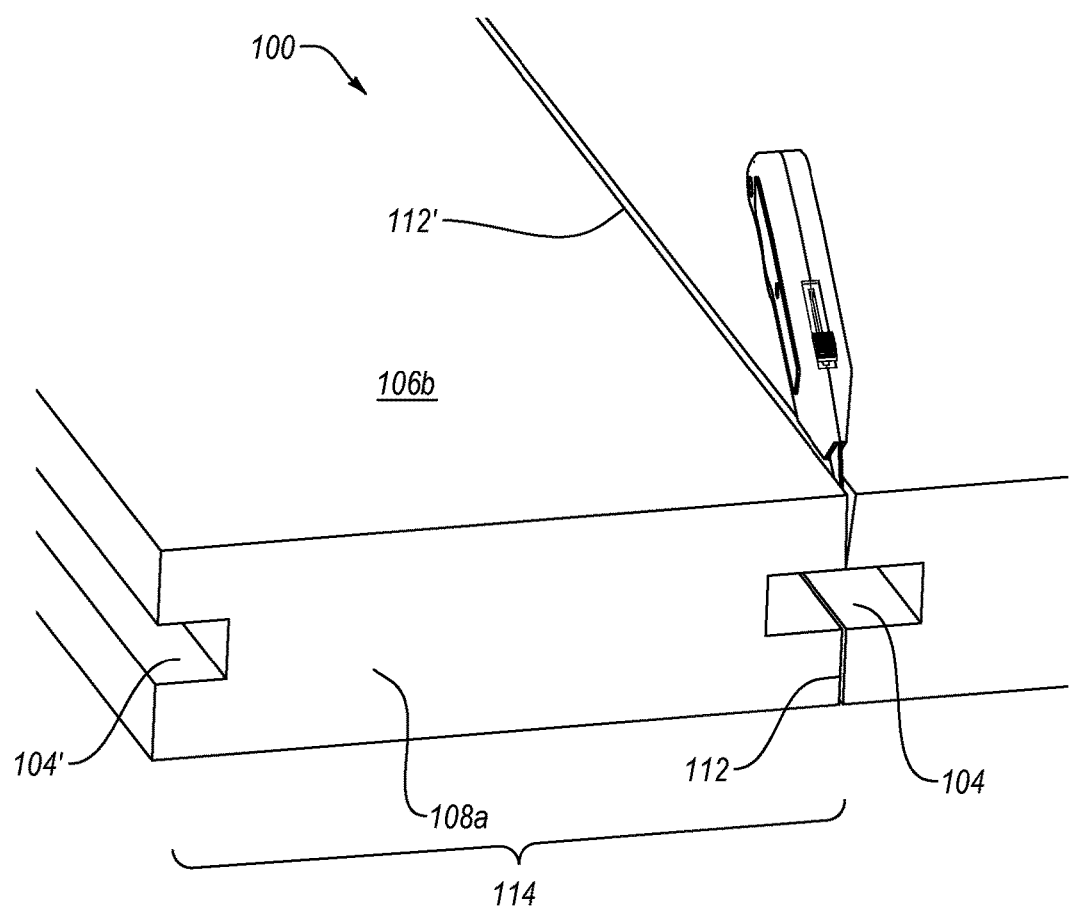
FIG. 3A is an isometric view showing how the modular panel of FIG. 1 can be easily cut along any of the score lines centrally aligned with the channel, to form a smaller modular panel based upon the same fractal as the panel of FIG. 1.
Figure 3B:
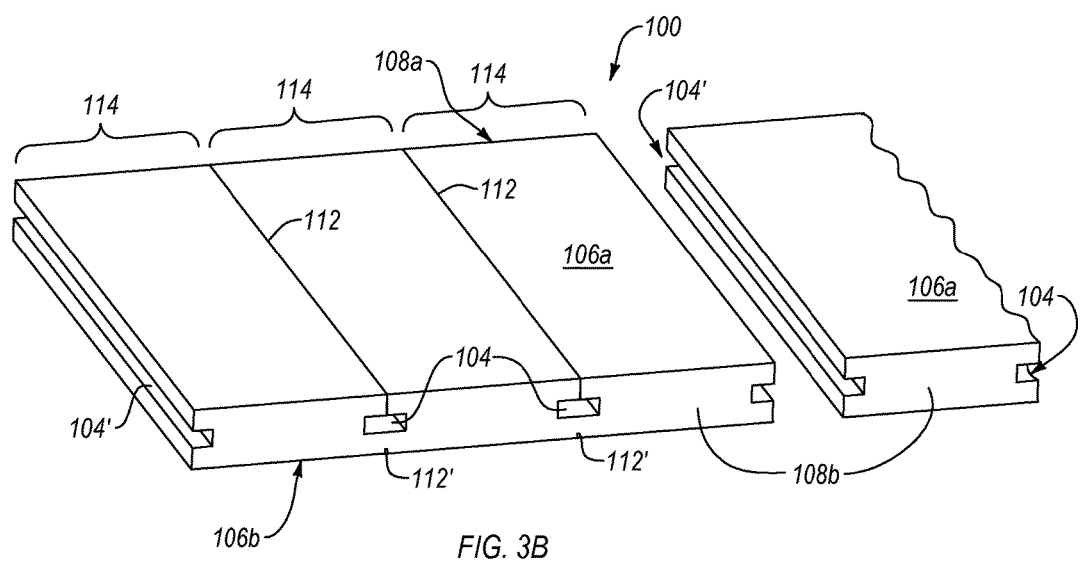
FIG. 3B is an isometric view showing the two resulting modular panels after the cut of FIG. 3A is made.
Figure 3C:
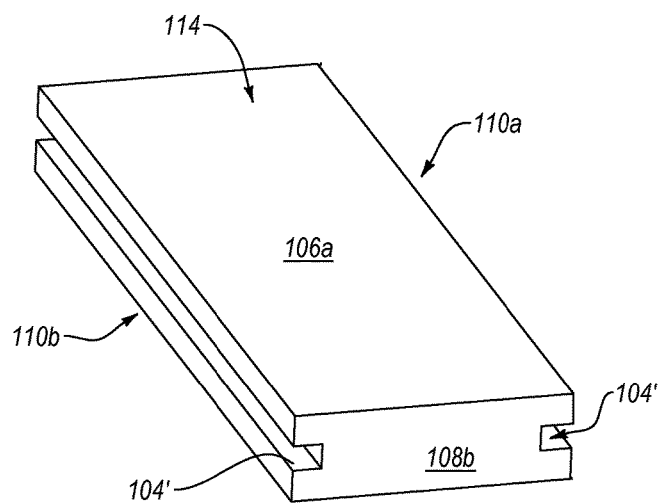

FIG. 3A shows panel 100 being cut (e.g., with a conventional box knife), along score line 112', which allows very quick and easy reduction in the size of the panel, should a panel having fewer fractal modules 114 be needed. FIG. 3B shows the cut panels including only 3 fractal modules being positioned on either side of the full panel (including 6 fractal modules), in preparation for assembling the wall of FIG. 2. FIG. 3C is a perspective view showing just a single fractal module 114, such as can be cut from any of the present panels. Panels may be formed so as to include any number of such fractal modules 114, in an integral configuration, formed from a single piece of material (e.g., EPS foam). By cutting along the score lines, such panels as formed may be reduced in size, where a panel having fewer fractal modules is needed. While illustrated as a single piece of foam material, it will be appreciated that if desired, the panel could be formed from two initially separate pieces (e.g., halves), each including one of faces 106a, 106b, which are that are glued or otherwise attached together. That said, the integral single piece of material configuration may be preferred for simplicity.

Figure 4A:
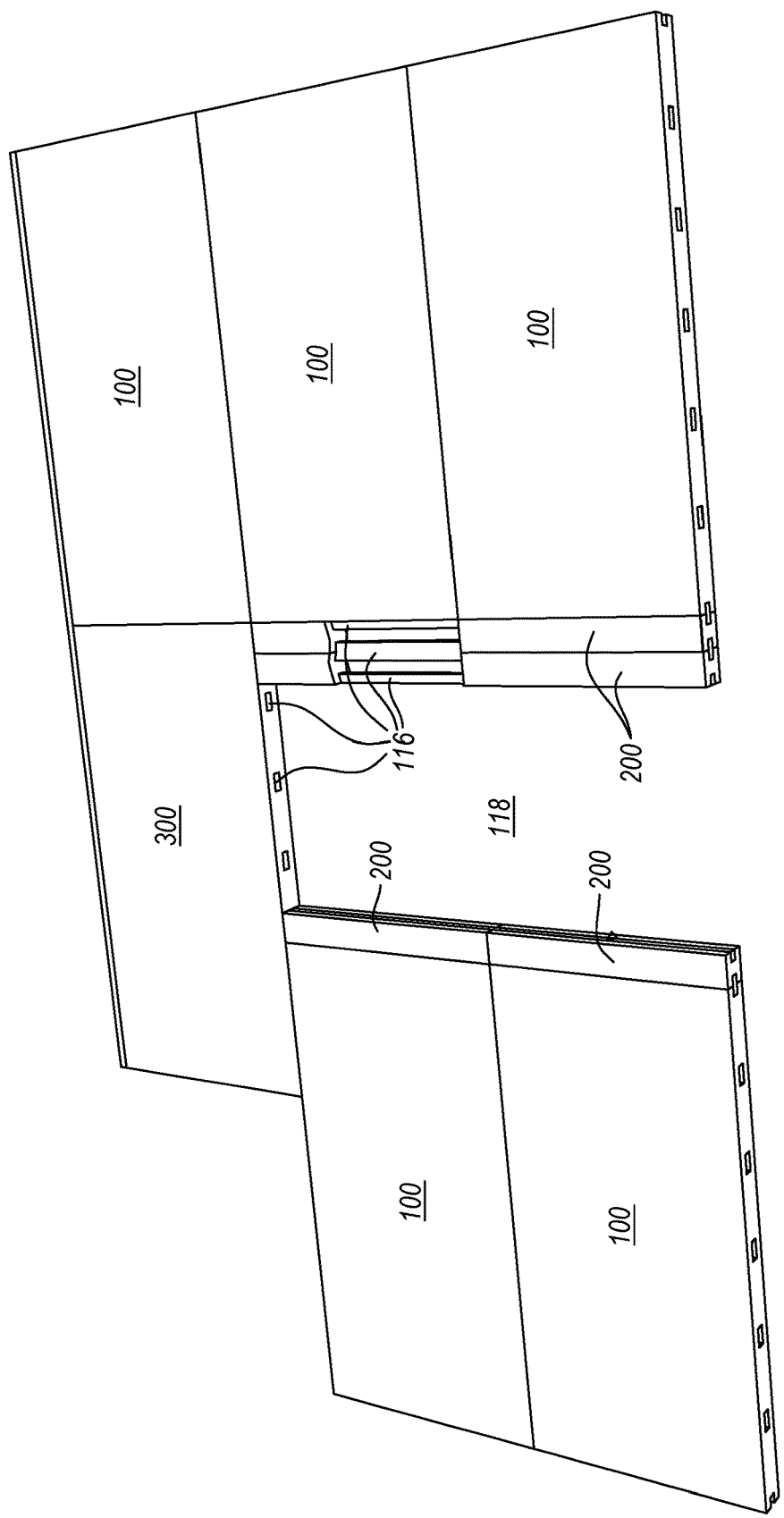
FIG. 4A shows use of a filler module for filling any space required to accommodate a door or window of given dimensions.
Figure 4B:
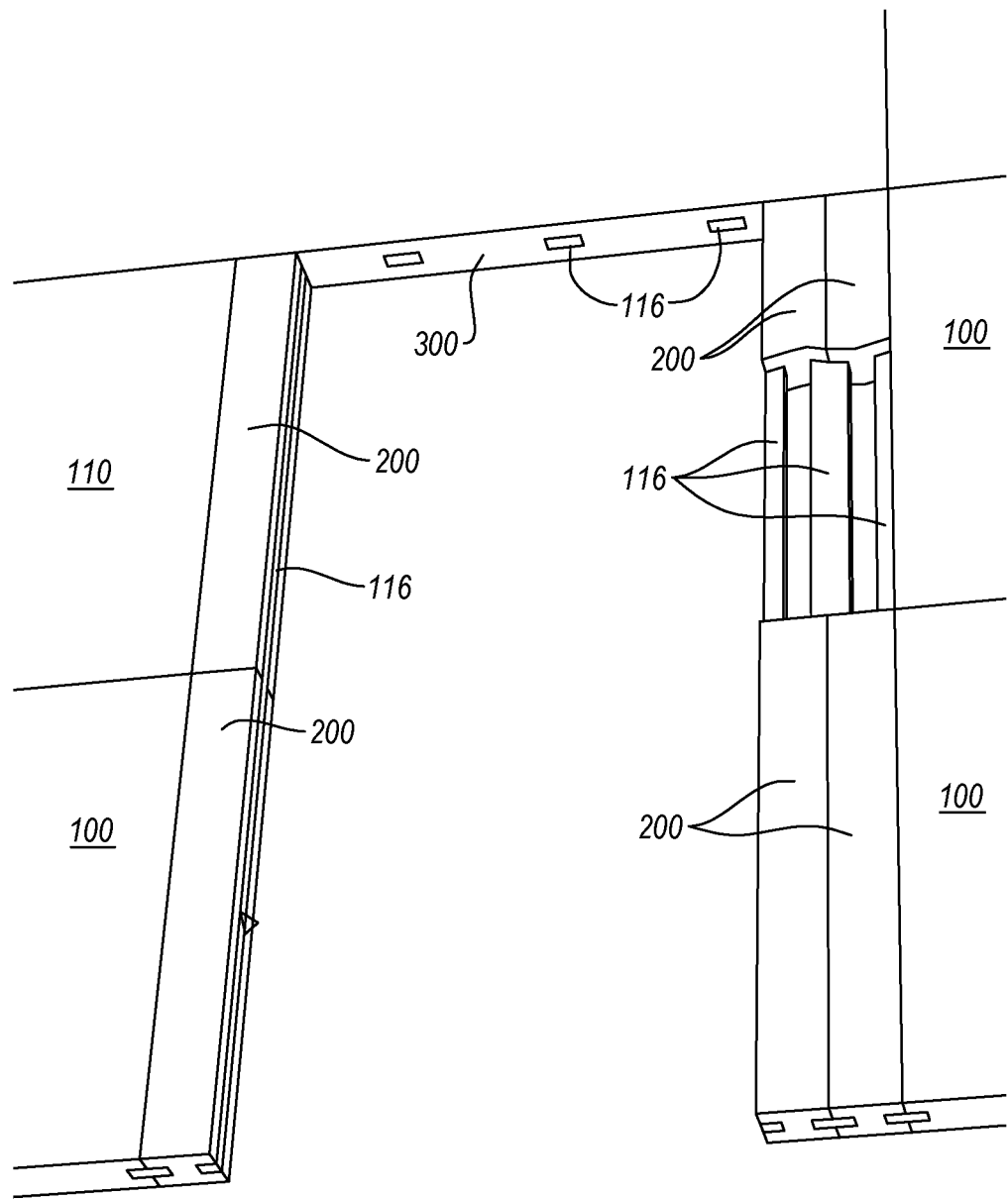
FIG. 4B shows a close up view of portions of FIG. 4A.

Many of the following Figures described hereafter show various configurations and uses in which the panels, splines, and building systems may be employed, as well as methods of use therefore. FIGS. 4A-4B show a plurality of panels 100, as well as a filler panel 200 and a header panel 300. Such a filler panel 200 may be used to close the space for a door or window opening 118, as shown. For example, the panels 100 may be cut if needed to the closest number of fractal modules that approaches the opening for the door or window opening 118, and where additional fill is needed to reduce the width of the opening 118, smaller filler modules 200, which have a width that is less than that of the fractal module (e.g., 16 inches, 24 inches, or the like) may be used. By way of example, the filler modular panel (see FIG. 4C) may be similarly based on fractal geometry, but simply one in which the spacing of the channels 104 for the splines are closer together, the pre-cut slots 112 are closer together, and any included score lines 112' are closer together.

Figure 4C:
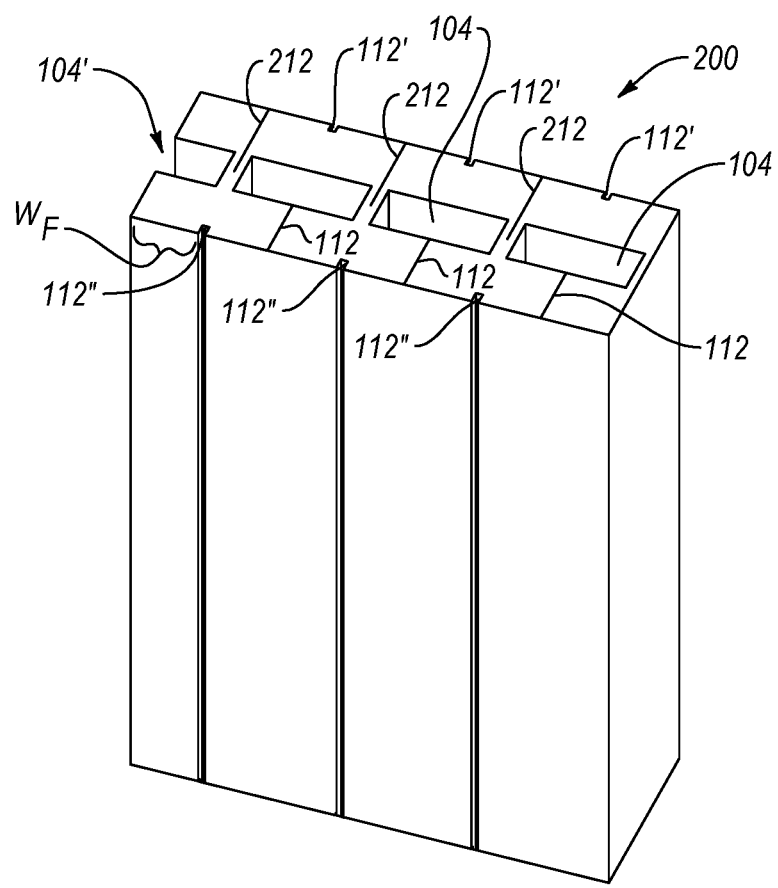
FIG. 4C shows an isometric view of an exemplary filler module, from which filler module pieces (such as used in FIGS. 4A-4B) may be cut.

For example, the fractal dimension of the filler modular panel may be 2 inches in width, allowing the user to quickly and easily fill the space associated with a door or window opening to accommodate the given door or window width. While a 2 inch fractal width for the filler modular panel may be exemplary, it will be appreciated that other fractal widths could be provided in such a filler modular panel (e.g., 1 inch fractal width, 3 inch fractal width, 4 inch fractal width, etc.), anywhere up to the fractal width of the standard panels 100. FIG. 4C illustrates an exemplary filler modular panel 200, from which smaller sections of filler modules may be quickly and easily cut, using the same principles for cutting the standard modular panels, so as to fill the space between the standard panel 100 and the required opening for the door or window. By way of example, FIGS. 4A-4B show use of 8 inches in width of a filler module cut from the filler modular panel seen in FIG. 4C.

The small fractal width $W_F$ of the filler modular panel is shown in FIG. 4C. Such dimension may be any smaller fractal dimension than that of the standard module, e.g., 2 inches. Stated another way, the fractal dimension of the filler module 200 may be less than 25%, or less than 20%, or less than 15% the fractal dimension of the standard module 100 (e.g., 2 inches vs. 16 inches). Furthermore, the fractal dimension of the standard module may be evenly divisible by the fractal dimension of the filler module (i.e., division of one into the other results in a whole number). As shown in FIG. 4A-4C, the splines 116 may be positioned closer together through the filler modular panels, based on the fractal dimensions of such filler panels. FIG. 4A also shows a header panel 300 that will be described in further detail below.

As shown in FIG. 4C, one face of filler module 200 may include pre-cut slots 112 that are centered on channels 104, just as in the standard panels. As shown, on the opposite face of filler module 200, there may be additional pre-cut slots 212 that may not be centered on the channels 104, but may be centered between such channels 104, instead. Channels 104 may be spaced double the fractal width (e.g., 4 inches), allowing the user to easily cut the filler module at any $W_F$ (e.g., 2 inch) increment, where such cut requires cutting only through half the panel thickness, or less (i.e., 2 inches at 112', or 2.75 inches at 112"). For example, filler module 200 of FIG. 4C includes 7 such fractals (each 2 inches wide, with the same height as a standard panel (e.g., 4 feet). Filler module 200 may be reduced in size to a smaller whole number of fractals, e.g., in 2 inch increments, to fill the door or window opening to the desired degree, so as to accommodate the door or window jamb.

Figure 5A:
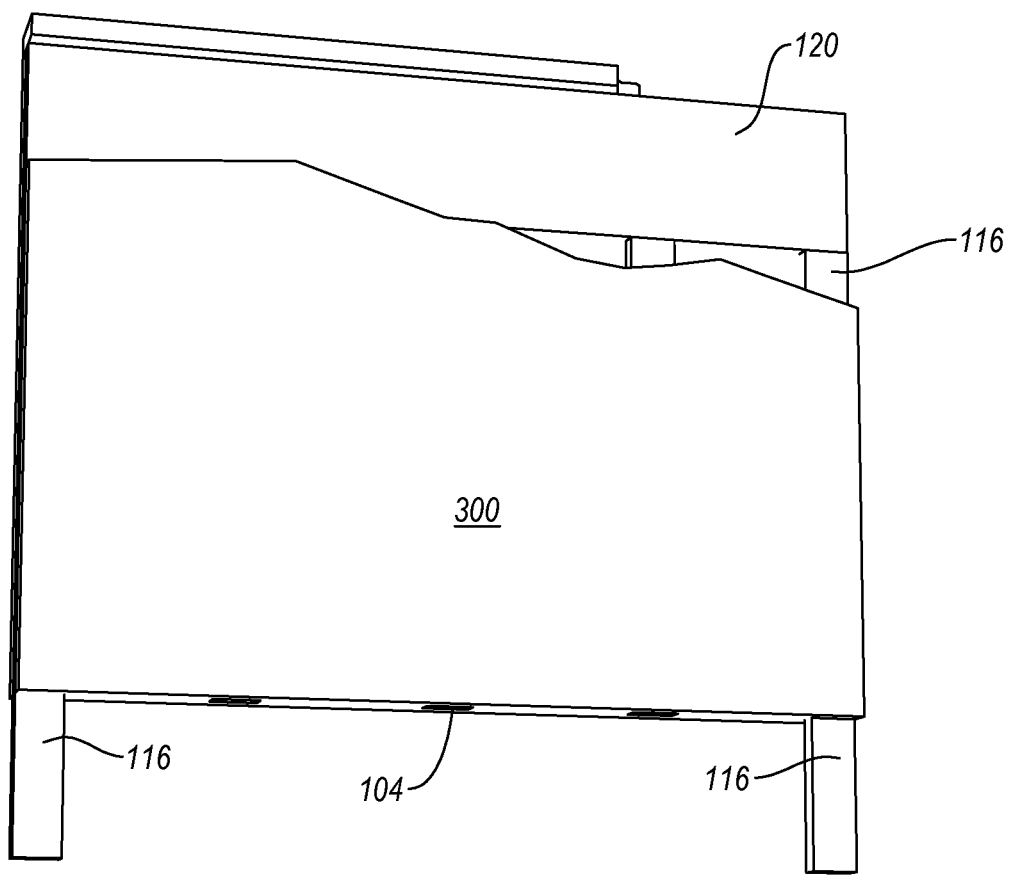
FIG. 5A shows a header modular panel.

FIG. 5A illustrates a header panel 300, showing how the panels may be specifically configured to embed a structural header. Such a structural header 120 may be received into the header panel 300, into a channel similar to channels 104, but which may run perpendicular thereto. For example, the header channel 122 may run longitudinally horizontally, intersecting with spline channels 104, so as to accommodate the standard framing construction methodologies that use studs spaced at regular intervals (e.g., 16 inches), with headers spanning any openings (e.g., for doors or windows). The foam panels simply accommodate such standard construction methods, making such construction far easier for those with limited or no special construction skills. Such structural header 120 may simply be an appropriately sized piece of dimensional lumber (e.g., a 2×8, 2×10, 2×12, or the like), and the channel configured to receive such header may be similarly sized to accommodate such header 120.

Figure 5B:
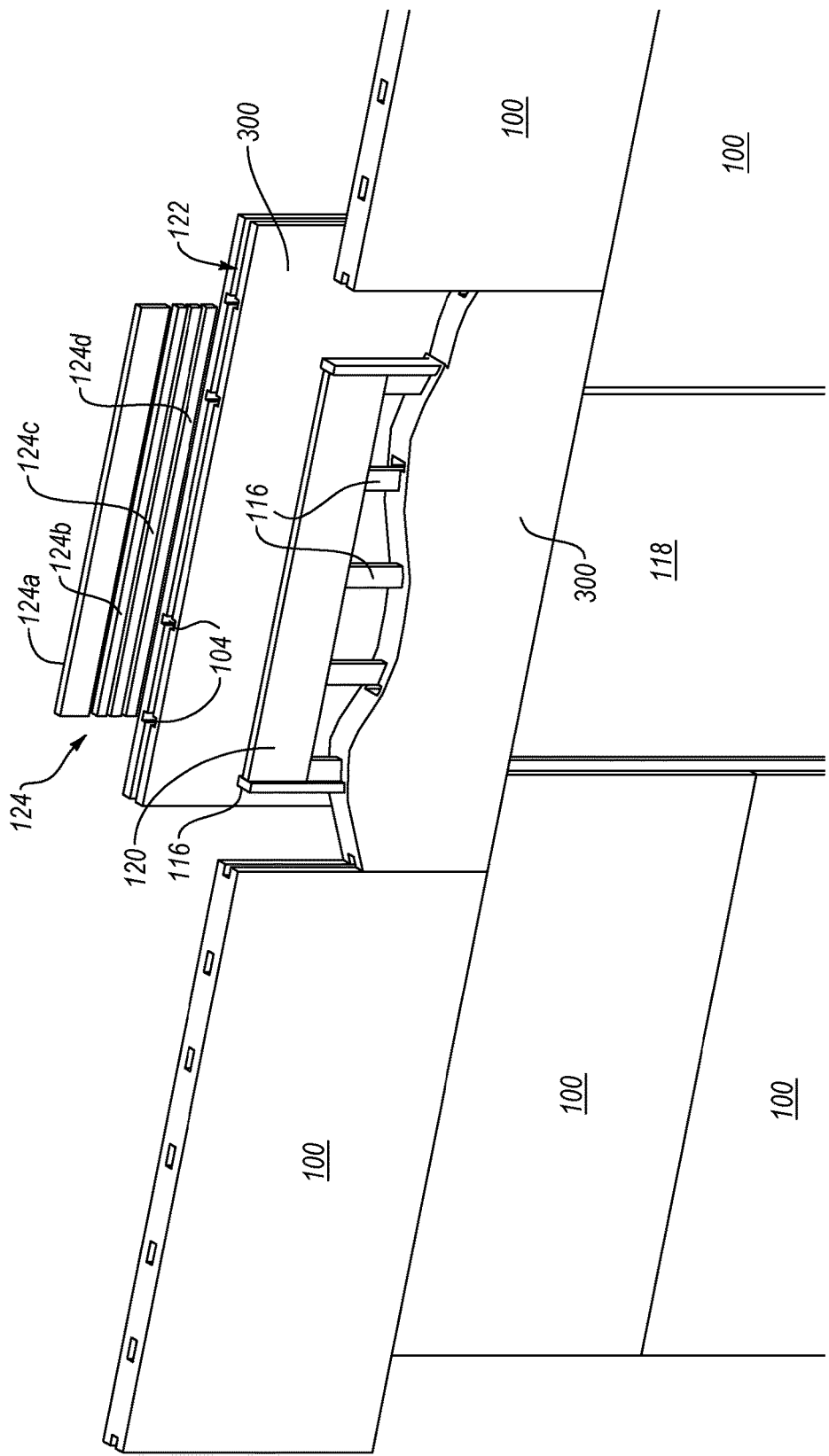
FIG. 5B shows a header modular panel similar to that of FIG. 5A, showing how the header modular panel may include pre-cut foam inserts which are selectively removable from a header slot, to allow a user to remove those foam inserts that correspond in size and shape to whatever dimensional lumber (or other material) header is inserted in the header slot. The other foam inserts remain in the header slot, filling any empty space that would otherwise exist adjacent the dimensional lumber header.

FIG. 5B illustrates further details of how such a header panel 300 may be configured. Header panel 300 may include the horizontal header channel 122 as shown, into which the underlying spline channels 104 may terminate or otherwise run. In the illustrated configuration, channels 104 are shown extending up to the top edge of panel 300. FIG. 5B further illustrates how the header panel 300 may be provided with selectively removable pre-cut filler inserts 124 which are selectively removable from header slot 122, to allow a user to remove those foam inserts 124 that correspond in size and shape to whatever dimensional lumber (or other material) header 120 is inserted in the header slot 122. The other foam inserts 124 can thus remain in the header slot, 122 filling any empty space that would otherwise exist adjacent the dimensional lumber header 120.

For example, the top insert 124a may have dimensions corresponding to a 2×6 header, where the combination of top insert 124b and next insert 124b may have dimensions corresponding to a 2×8 header, and so on. In other words, 124a+124b+124c have dimensions corresponding to a 2×10 header, and 124a+124b+124c+124d have dimensions corresponding to a 2×12 header. A user simply removes the top insert 124a, and if a header larger than a 2×6 is being used, additional inserts are removed, so as to accommodate whatever sized header is being used. By way of example, if a 2×10 header is being used, inserts 124a-124c may be removed to customize the height of the channel 122 to be that of a 2×10, and the 2×10 header may be inserted into header channel 122 so that it fully seats into the bottom of the channel, against the splines 116 in channels 104 thereunder. Header 120 and splines 116 may be attached by conventional nails, screws, adhesive, or combinations thereof.

Figure 6:
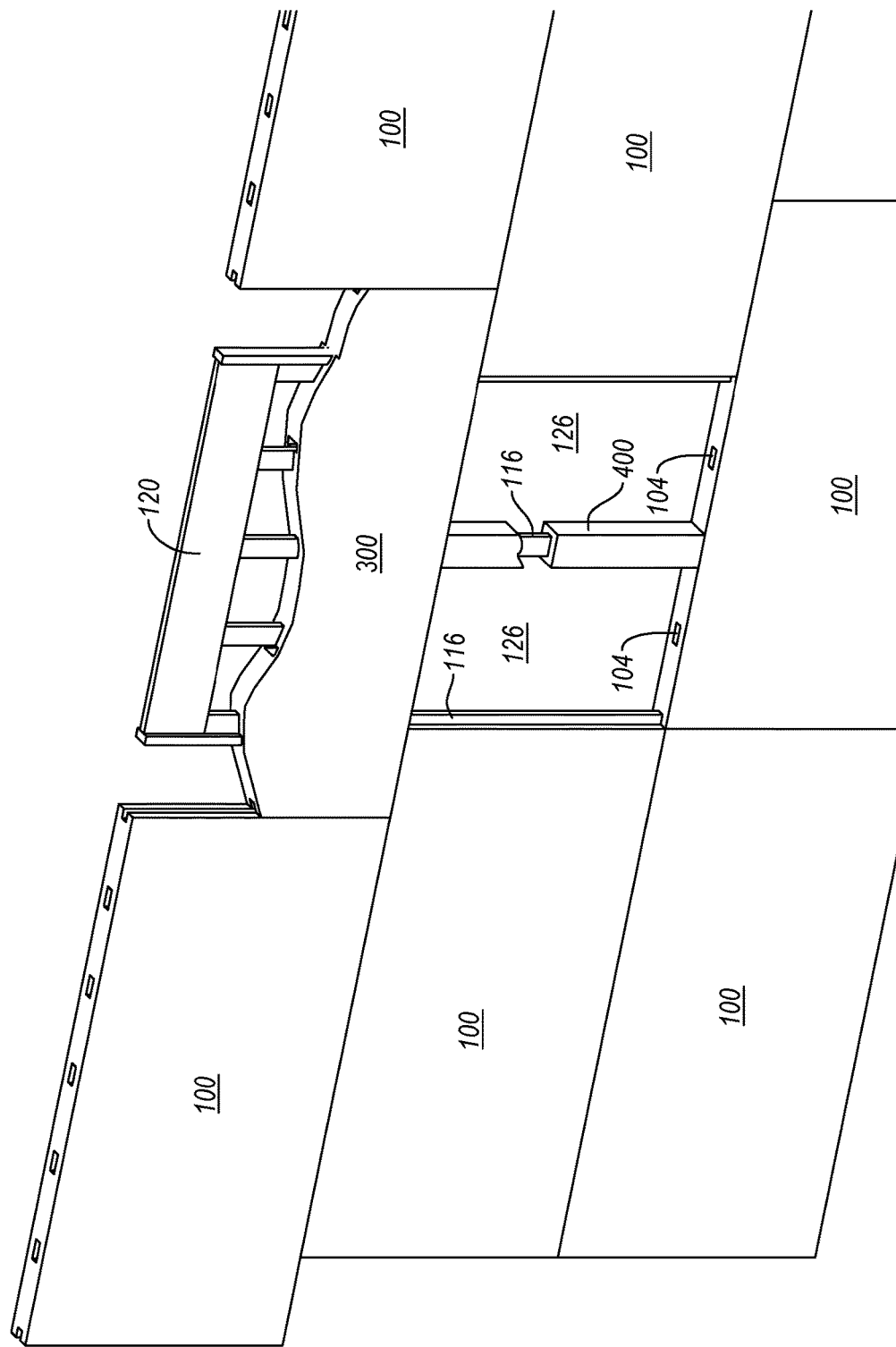
FIG. 6 shows a window jamb filler module that may be used between closely spaced adjacent windows.

FIG. 6 illustrates a window jamb filler module 400, which may be used to encase a spline between closely spaced adjacent window openings 126, e.g., where the spacing between such window openings is less than the fractal width associated with standard modular panels 100 (e.g., 16 inches). For example, such a window jamb filler module may have a width of 4 inches, 5 inches, or 6 inches. Filler modules as shown in FIG. 4C could alternatively be used to fill such space around a spline 116 between window openings 126.

Figure 7A:
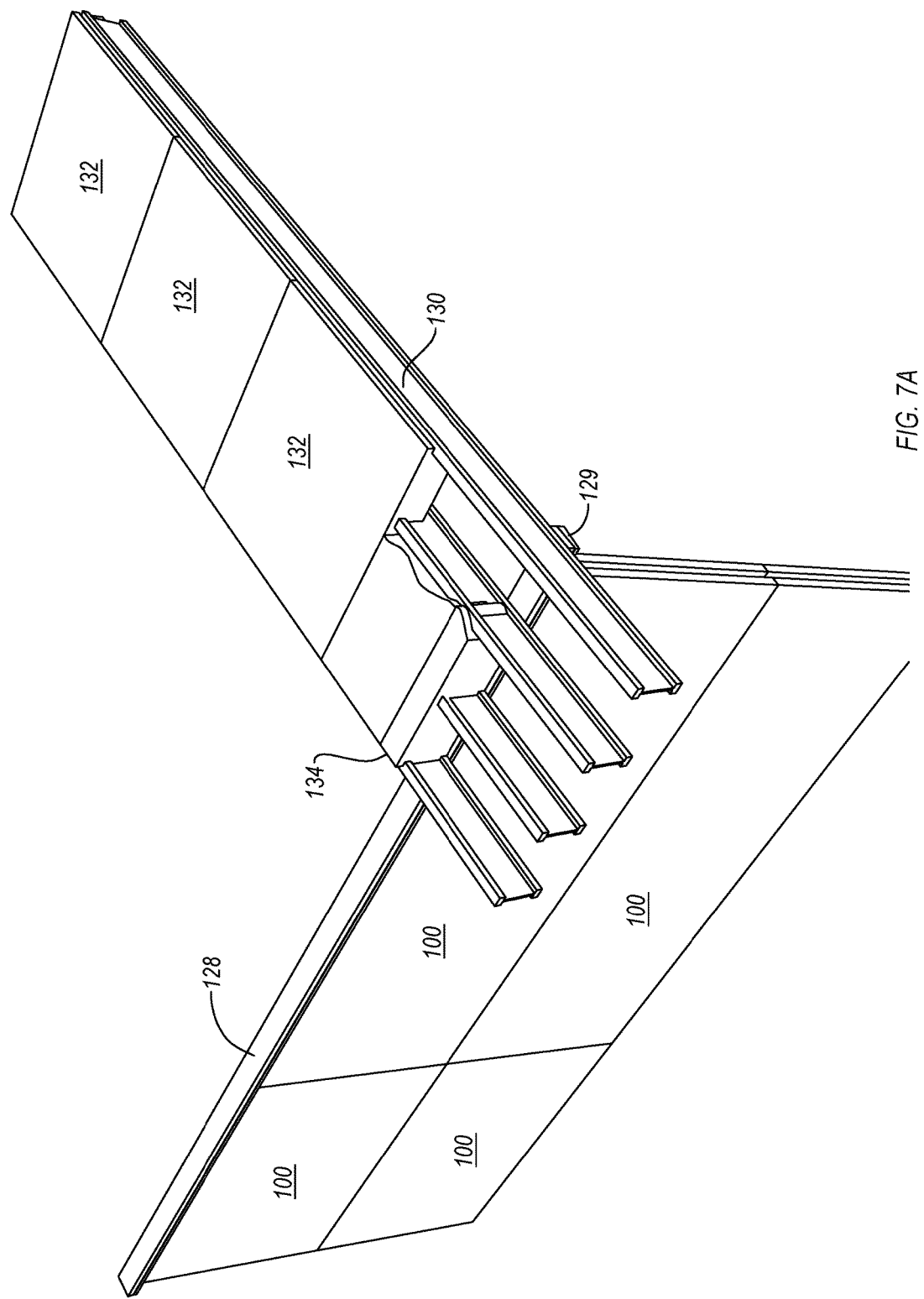
FIG. 7A shows the panels used to construct a wall, which supports a roof formed from roof insulation panels which mate with truss joists (TJIs) of the roof.
Figure 7B:
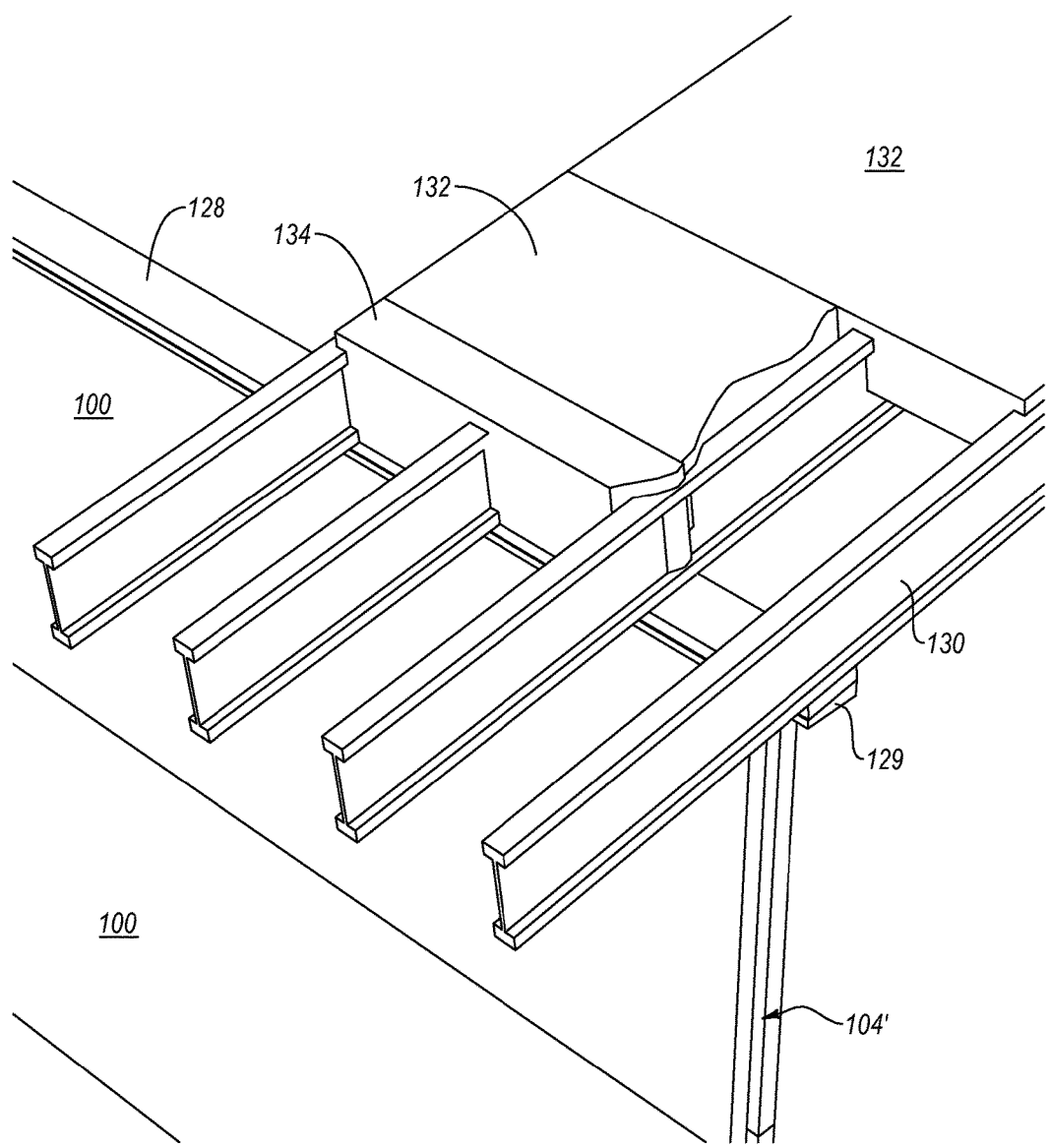
FIG. 7B shows a close up view of portions of FIG. 7A.

FIGS. 7A-7B illustrate use of panels 100 in construction of a wall, including a cap plate 128 (e.g., also of dimensional lumber) which supports a roof formed from roof insulation panels which mate with conventional truss joists 130 (TJIs) of the roof. Cap plate 128 is provided at an angled incline, due to the presence of angled foam cap insert 129 sandwiched between cap plate 128 and the top edge of panels 100. Any desired roof pitch may be accommodated by such construction. Exemplary pitches include any desired pitch ratio, such as from 12/1 to 12/18 (e.g., 12/1; 12/2, 12/3; 12/4; 12/5; 12/6; 12/7; 12/8; 12/9; 12/10; 12/11; 12/12; 12/13; 12/14; 12/15; 12/16; 12/17; or 12/18). A flat roof is of course also possible. A bottom cap plate may similarly be provided adjacent the floor, at the bottom of panels 100, where the splines may be attached (e.g., nailed or screwed) into such bottom plate.

As seen in FIGS. 7A-7B, the roof may be formed from foam roof panels which include slots cut therein (e.g., by the same CNC hot wire cutter used to form panels 100) so that the roof panels 132 slide onto the ends of TJIs 130. A top plate seal 134 may also be provided, as roof panels 132 may not reach down the full height of TJIs 130, as shown. Because roof panels 132 do not extend down the full height of TJIs 130, this unfilled space below panels 132 can be used for electrical and/or plumbing runs.

Figure 7C:
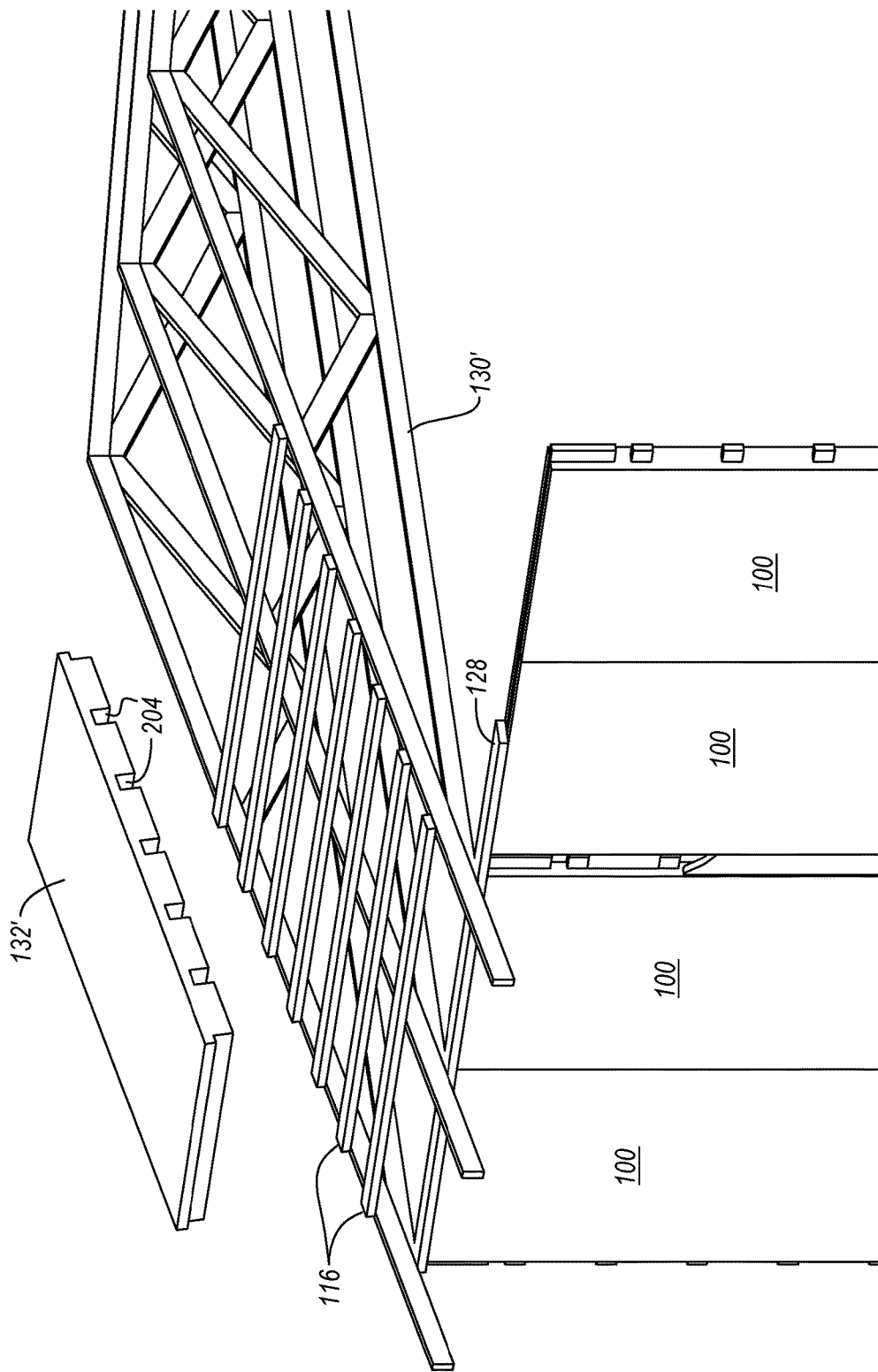
FIG. 7C shows an alternative roof construction as compared to that of FIGS. 7A-7B.

FIG. 7C illustrates an alternative configuration of a roof panel 132' which is shown for use with conventional triangular roof trusses 130'. Trusses 130' are supported on a cap plate 128, without the need for any angled insert 129, as the pitch of the roof is provided by roof trusses 130'. Roof panel 132' simply includes U-shaped channels 204 cut into one face of panel 132' using the same CNC hot wire cutter as used to form the other foam panels. Roof splines 116 may simply be run across the roof trusses 130' as shown, spanning multiple trusses 130', with roof splines 116 including the same spacing as the U-shaped channels 204 (e.g., 16 inch centers). Once the roof splines are attached to the roof trusses 130', the roof panel 132' may simply be pressed over the top of the pre-installed roof splines 116. Such a method does not require sliding the roof panels 132' into over any splines, TJIs, or the like, where alignment of the panel in order to slide it over the TJIs as seen in FIG. 7B may be difficult.

It will also be noted that the wall splines 116 in standard panels 100 seen in FIG. 7C may be oriented horizontally, rather than vertically, with panels 100 oriented vertically, rather than horizontally (i.e., the long dimension (e.g., 8 feet) is oriented vertically, rather than horizontally, as seen in FIG. 7B. Such an alternative orientation and wall construction will be described in further detail hereafter (e.g., see FIG. 9A-10).

Figure 7D:
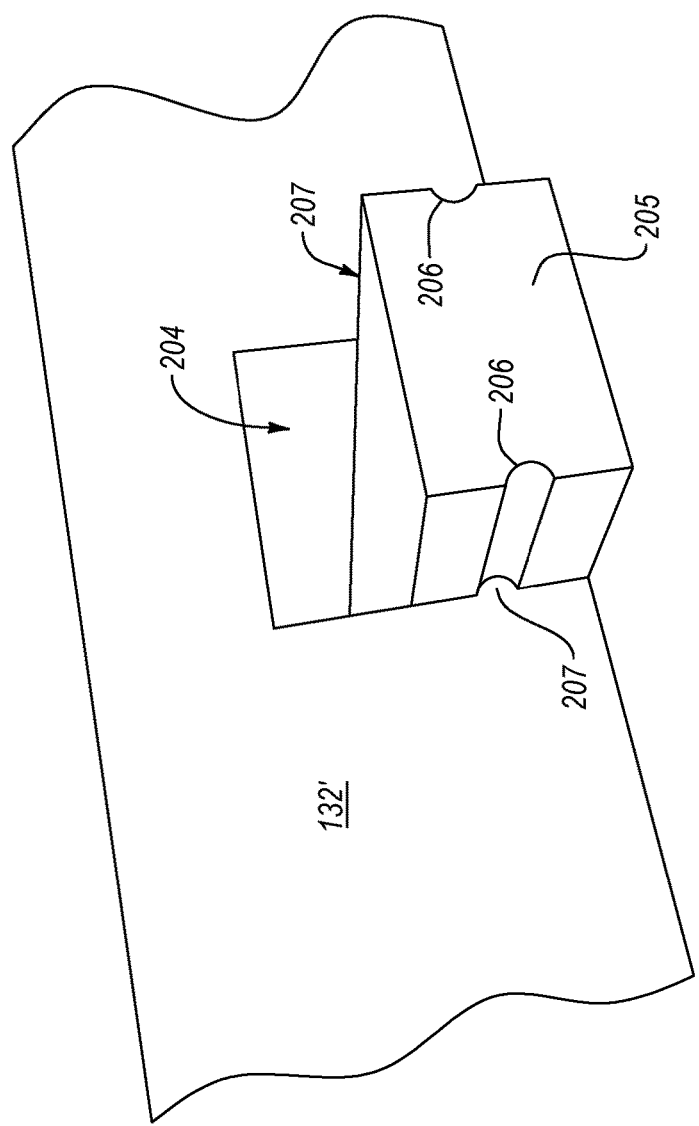
FIG. 7D shows a close up view of a roof panel such as that seen in FIG. 7C, showing how inserts may be retained in the U-shaped channels of the roof panel.

FIG. 7D illustrates how an exemplary roof panel (e.g., panel 132') may be configured such that the piece that was cut from the U-shaped channel 204 may be insertable back into channel 204, to provide increased insulation value to the roof constructed therefrom. For example, once roof panel 132' is placed over trusses 130', with the horizontal cross members being aligned to insert into channels 204, any remaining depth of channel 204 may be filled with such channel inserts 205. In an embodiment, inserts 205 and/or channels 204 may include protrusions and/or recesses which mate with one another, helping to retain insert 205 into channel 204 once pressed therein. For example insert 205 may include one or more recesses 206, and the walls defining channel 204 may include corresponding protrusions 207 which are received into recesses 206. Alternatively, the protrusions may be on insert 205, with the recesses formed into the walls defining channel 204.

Figure 8:
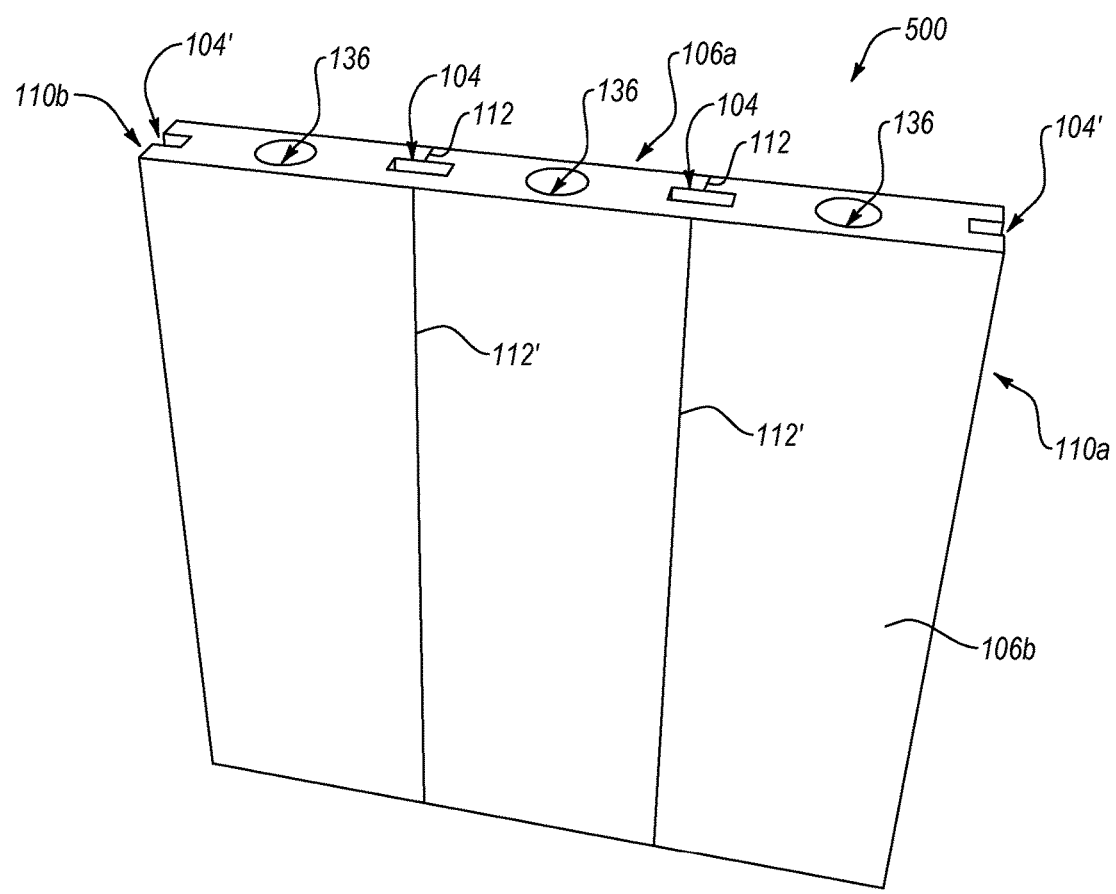
FIG. 8 shows how the modular panel may be provided with electrical or plumbing raceways therein.

FIG. 8 illustrates how any of the panels (e.g., standard panel 100) may include raceways 136 formed therein, for electrical and/or plumbing components. Such panel is designated 500. While only shown as occupying 3 fractal modules, it will be appreciated that more or fewer fractal modules may be provided within such an electrical or plumbing modular panel 500. Such raceways may be formed in the same way that channels 104, 104' are formed (and slots 112 and score lines 112' are formed), e.g., by the high precision CNC hot wire cutting device. Such raceways 136 may be formed to extend parallel with channels 104 as shown, or perpendicular thereto, or combinations thereof, or any other conceivable configuration. In an embodiment, as shown, the raceways do not intersect the faces 106a, 106b of panel 500, just as channels 104, 104' of any of the panels also do not intersect such faces. As described above, such intersection with the face can result in ghosting problems in the finished structure, due to the presence of a different material than that of foam body 102 exposed on the face 106a or 106b of such panels, even after covering with a sheathing material.

Figure 9A:
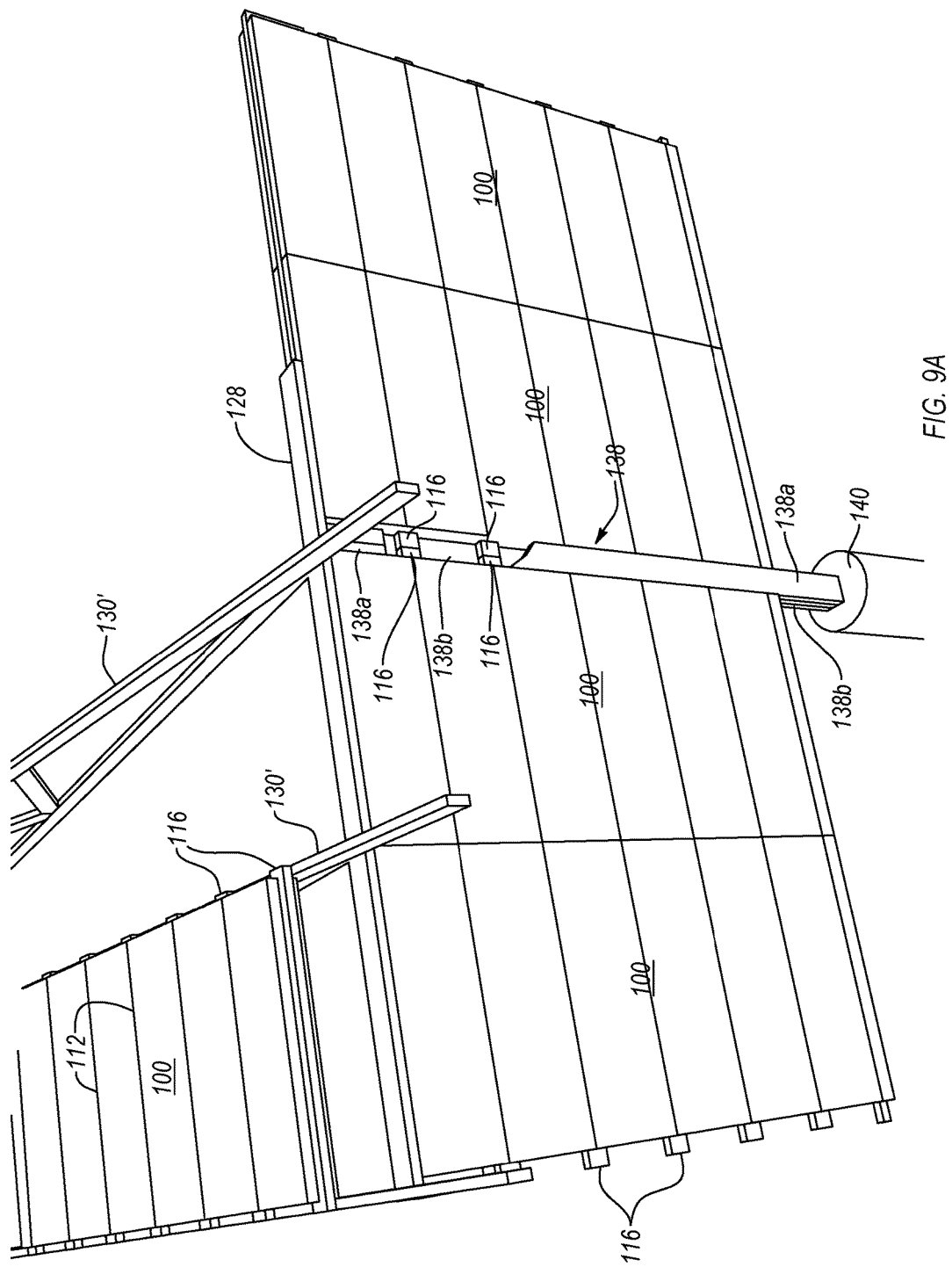
FIG. 9A shows panels that may include horizontal channels and splines, along with vertical posts between some panels, further illustrating use of the panel of FIG. 1 (with vertical channels) as a roof panel attachable to trusses.

FIG. 9A illustrates a wall construction in which panels 100 are aligned with their longitudinal (long) axis vertically, rather than horizontally, so that wall splines 116 run horizontally, rather than vertically in the wall structure. This Figure also illustrates the same panel 100 being used as a roof panel, where roof splines 116 are attached to conventional triangular roof trusses 130'. For example, such roof panels 100 may have the roof splines 116 inserted into channels 104, 104', after which the assembly of the panel and splines may then be attached over adjacent trusses 130'.

FIG. 9A further illustrates a cut away, showing how such horizontally oriented wall splines 116 may be integrated into a post and beam type construction of the wall. For example, horizontal wall splines 116 extend beyond a single panel 100, e.g., being inserted into channels 104 of adjacent panels 100 as channels of more than one panel 100 are aligned with one another. At locations between some panels 100, a vertical post 138 may be provided. In the illustrated configuration, post 138 may be supported on a concrete footing or column 140, running up to cap plate 128. Post 138 may include inner and outer vertical post members 138a, 138b, which capture and sandwich horizontal wall splines 116 therebetween, as shown in the cut-away portion. In an embodiment, joints between adjacent aligned splines may be made at the location of posts 138, sandwiched between post members 138a, 138b, forming a lap joint as shown. Blocking may be used between post members 138a, 138b between splines 116, forming a very strong post and beam type construction.

Figure 9B:
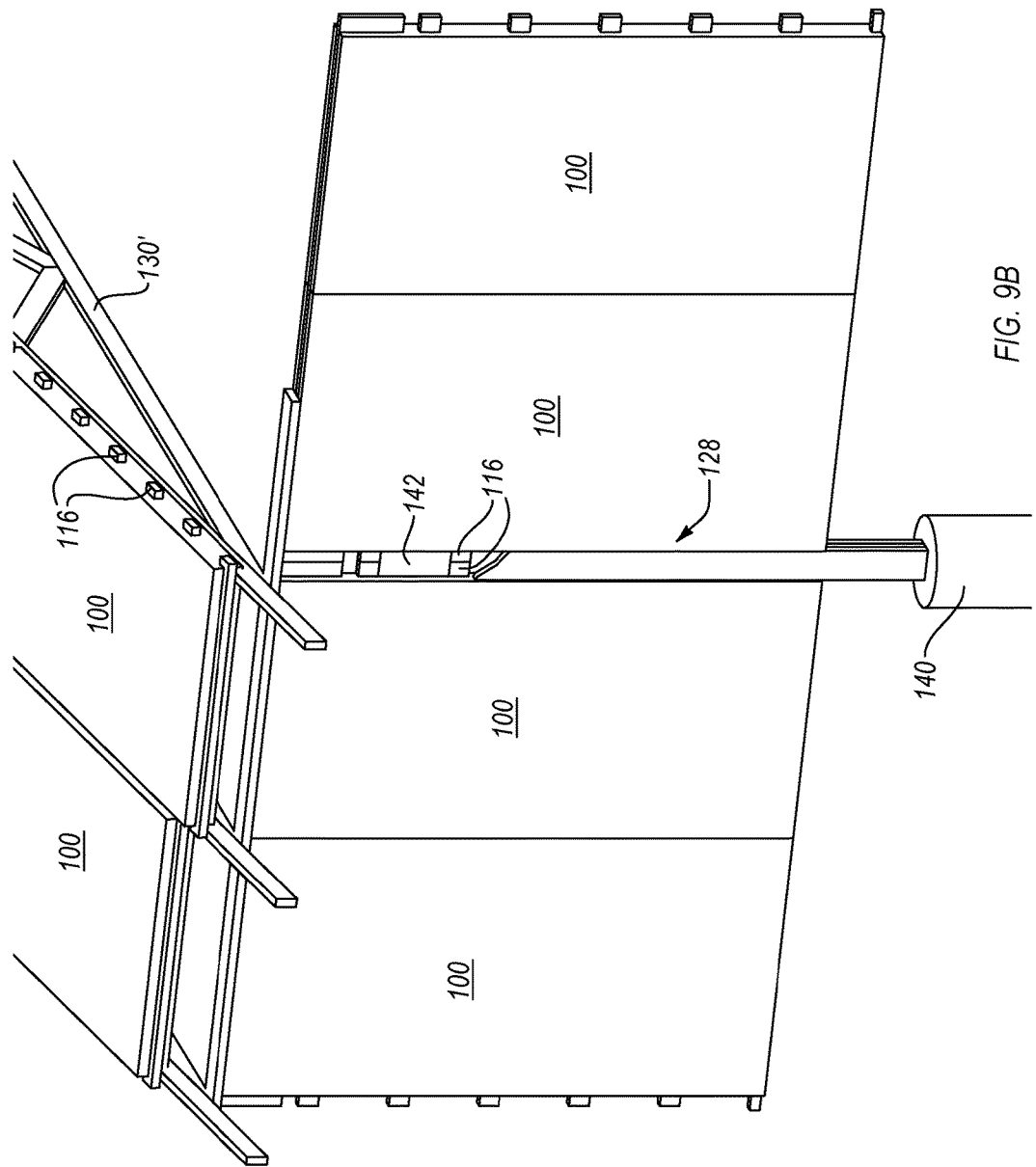
FIG. 9B shows a post and beam type construction (similar to that of FIG. 9A) which may employ modular panels as described herein. Vertical posts may be provided between some of the panels, where vertical post members form a sandwiching lap joint with the horizontal splines that extend through the modular panels.

FIG. 9B illustrates another view, showing similar horizontal wall splines 116 in panels 100, with post and beam construction, where the post members are blocked (blocking 142), and form a lap joint with horizontal splines 116.

Figure 10:
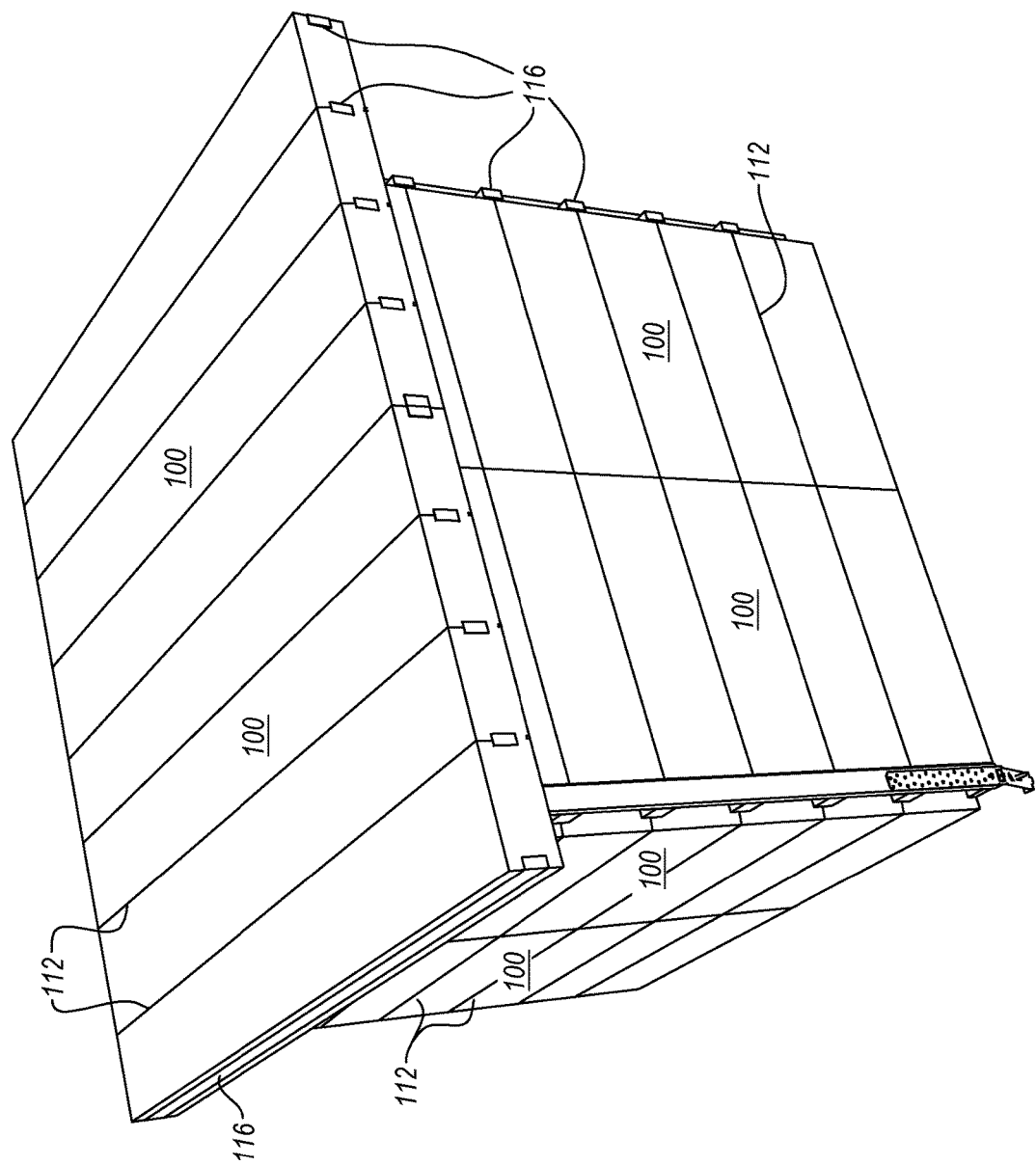
FIG. 10 shows how a small structure such as a shed may be constructed from such modular panels.

FIG. 10 shows how a small structure such as a shed may be constructed from such modular building panels. The entirety of the roof and walls may be provided by such panels, with splines received in channels 104, 104'. A close examination of the roof panels of FIG. 10 will show that the channels are rotated 90° relative to the configuration of FIG. 1. Panels with the orientation of FIG. 1 could alternatively be used. Furthermore, it will be apparent that panels having the orientation seen in the foot panels of FIG. 10 may be employed in wall construction.

Figure 11:
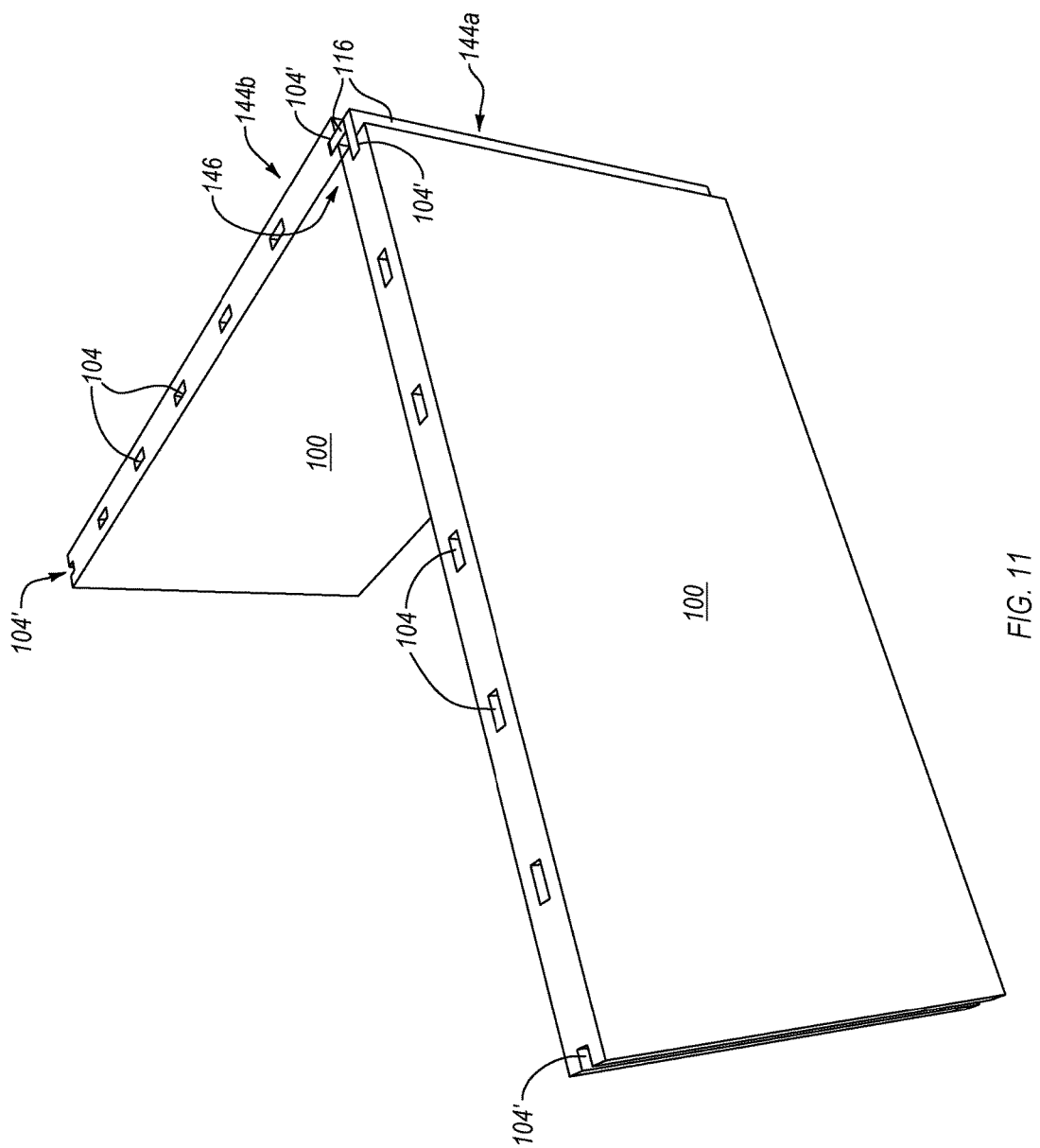
FIG. 11 shows how a corner may be formed between different walls, so that there is no overlap of the modular panels of one wall with the modular panels of the other wall, but that the faces of the modular panels of the two walls only contact one another at their adjoining corners. Splines inserted into the channels on the ends of the respective panels may be used to connect the two walls together.

FIG. 11 shows how a corner may be formed between different walls, so that there is no overlap of the modular panels 100 of one wall (e.g., wall 144a) with the modular panels of the other wall (wall 144b), but that the faces of the modular panels of the two walls only contact one another at their adjoining corners (i.e., at 146). Such construction ensures that the fractal modular characteristics provided by the modular panels are maintained, across the building being constructed. For example, if there were overlap from one panel over the other (e.g., one face 106a or 106b overlapping an end of another panel (e.g., end 110a or 110b), then the effective length of the overlapping panel is decreased, which throws off the modularity of any construction based on such panels. Thus, when forming a corner where two walls come together, only the corner edges of the panels come to contact one another, in a "kitty-corner" arrangement, only meeting at their opposed corners, with no actual overlap.

FIG. 11 further shows how splines 116 inserted into the half-size end channels 104' of panels 100 of adjoining walls 144a, 144b may be used to connect the two walls 144a, 144b together, while maintaining no overlap of the foam bodies of the panels 100 that make up walls 144a and 144b.

Figure 12:
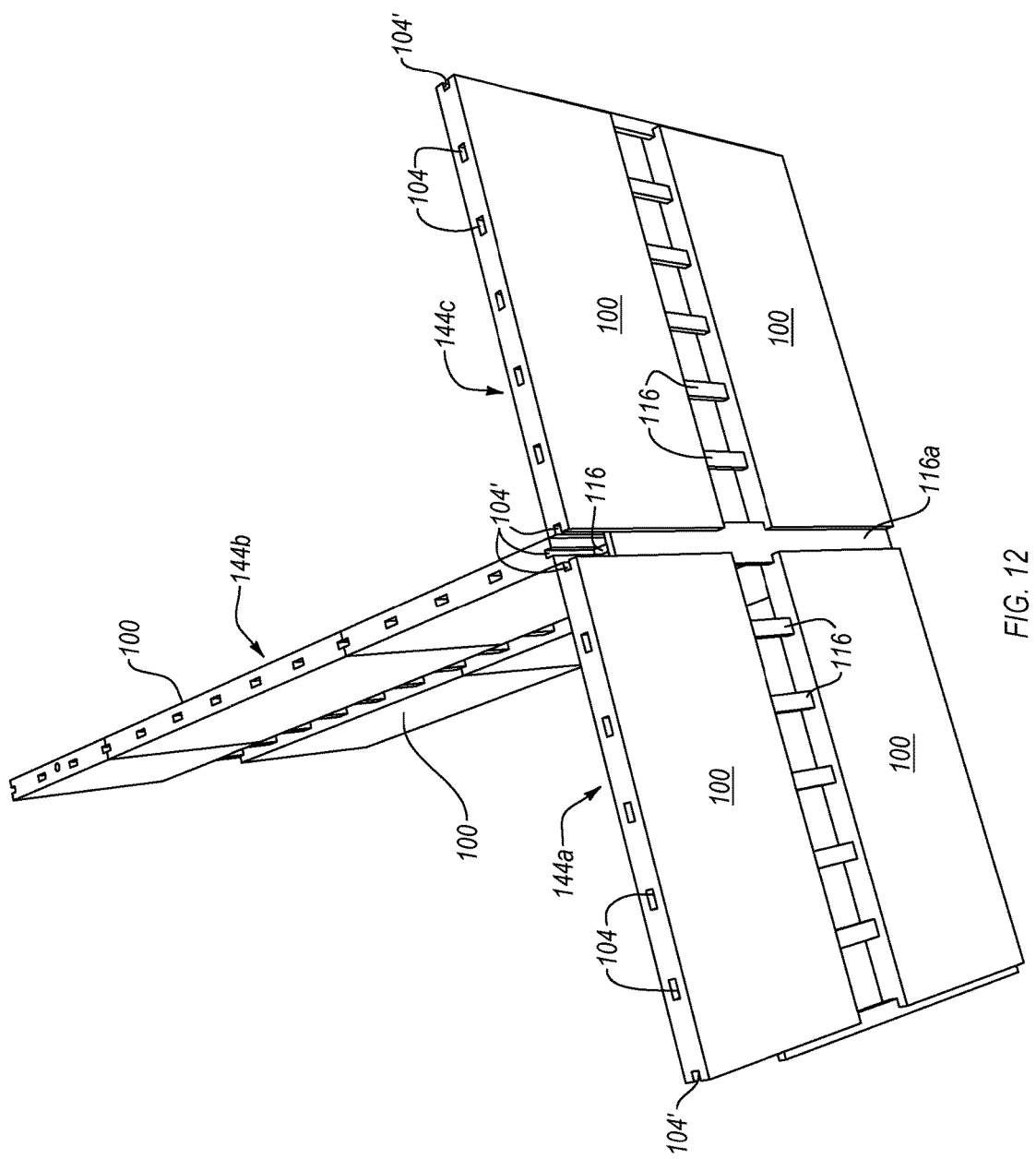
FIG. 12 shows a T-connection, where 3 walls come together, without any overlap between any of the 3 walls, but in which connection of the 3 walls is made through splines that are received into the 3-half channels (one on each edge of each wall).

FIG. 12 shows a T-connection, where three walls 144a, 144b and 144c come together, without any overlap between any of the panels from one wall, with any panels from another wall, but in which connection of the three walls is made through a standard spline 116 (e.g., a 2×4, just as all the other wall splines) and a wider spline 116a (e.g., a 2×10) both of which are received into the 3-half size channels 104' (one on each edge of each of walls 144a, 144b, 144c). More specifically, the spline 116a spans the thickness (e.g., 5.5 inches) of wall 144b, with the sides of spline 116a being received into the half-size channels 104' of wall 144a and 144b. This allows for there to be no overlap between the foam panels 100 of wall 144a with wall 144b, and no overlap between panels 100 of wall 144b with wall 144c, as shown. All three panels come together so that the corners at the interface between the panel face 106 and the panel edge 110 are "kitty-corner", with no overlap from one panel to the next.

A 2×4 spline is received into half-size channel 104' of the panel of wall 144b, and this spline is easily nailed, screwed, glued, or otherwise attached to spline 116a, forming a very sturdy connection, which is typically fully compatible with existing building codes, so that no dedicated strength testing of the present panels is required. In other words, the present construction methods and panels are typically fully compatible with already conventional adopted and approved building codes. Such compatibility is one key advantage of the present invention over some of Applicant's earlier applications, and others in the art, where new building systems require dedicated third party testing and validation in order to be accepted for use under typical building codes. Such a problem represents a significant barrier to entry for such systems. The present systems will not typically require any such testing, as they may already be fully compatible with existing building codes.

Figure 13A:
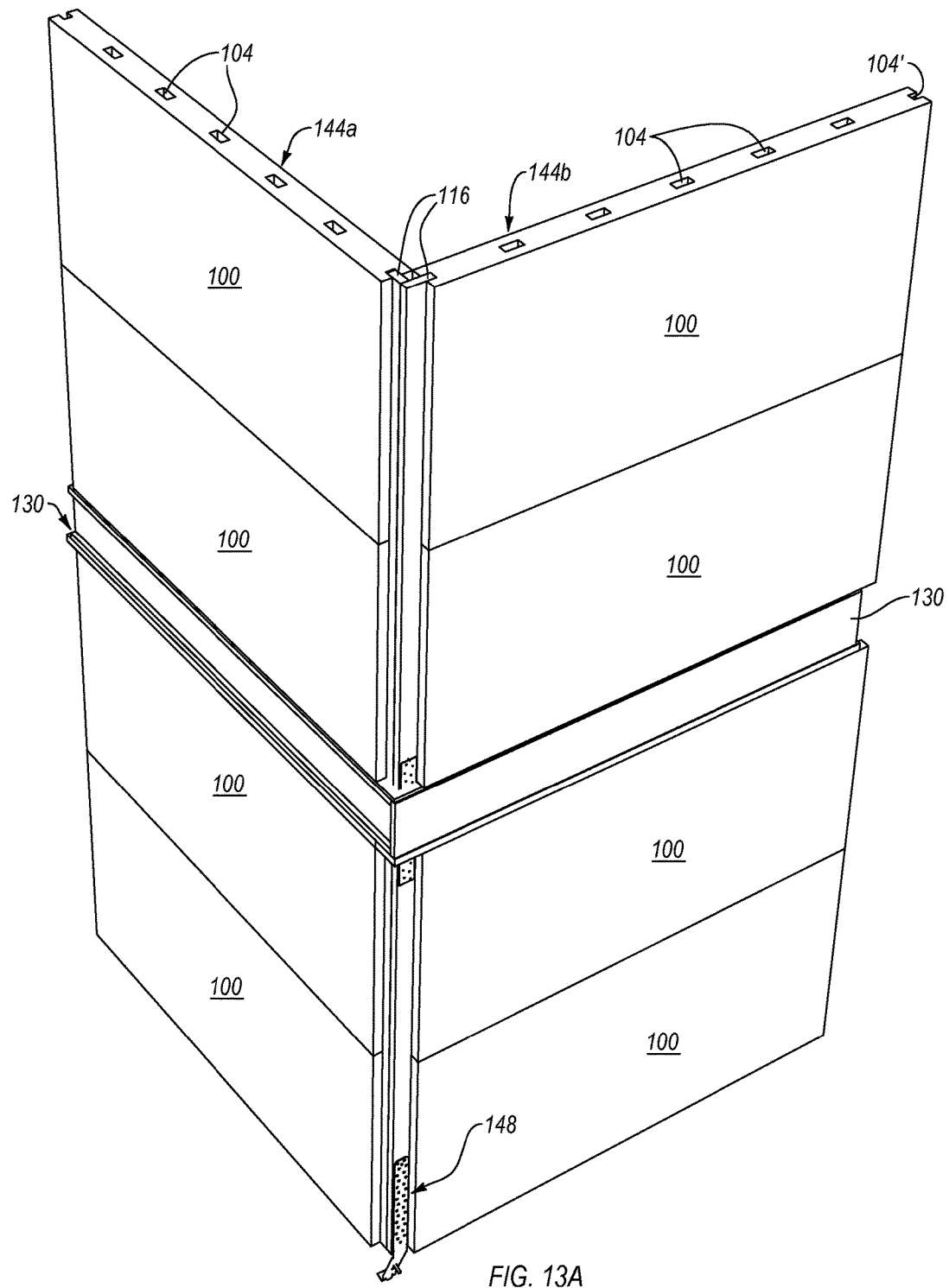
FIG. 13A shows how the corner between two walls may be reinforced with a tie down. The tie down may be attached to one or more splines received into the half-size channels on the ends of the modular panels of the respective walls.
Figure 13B:
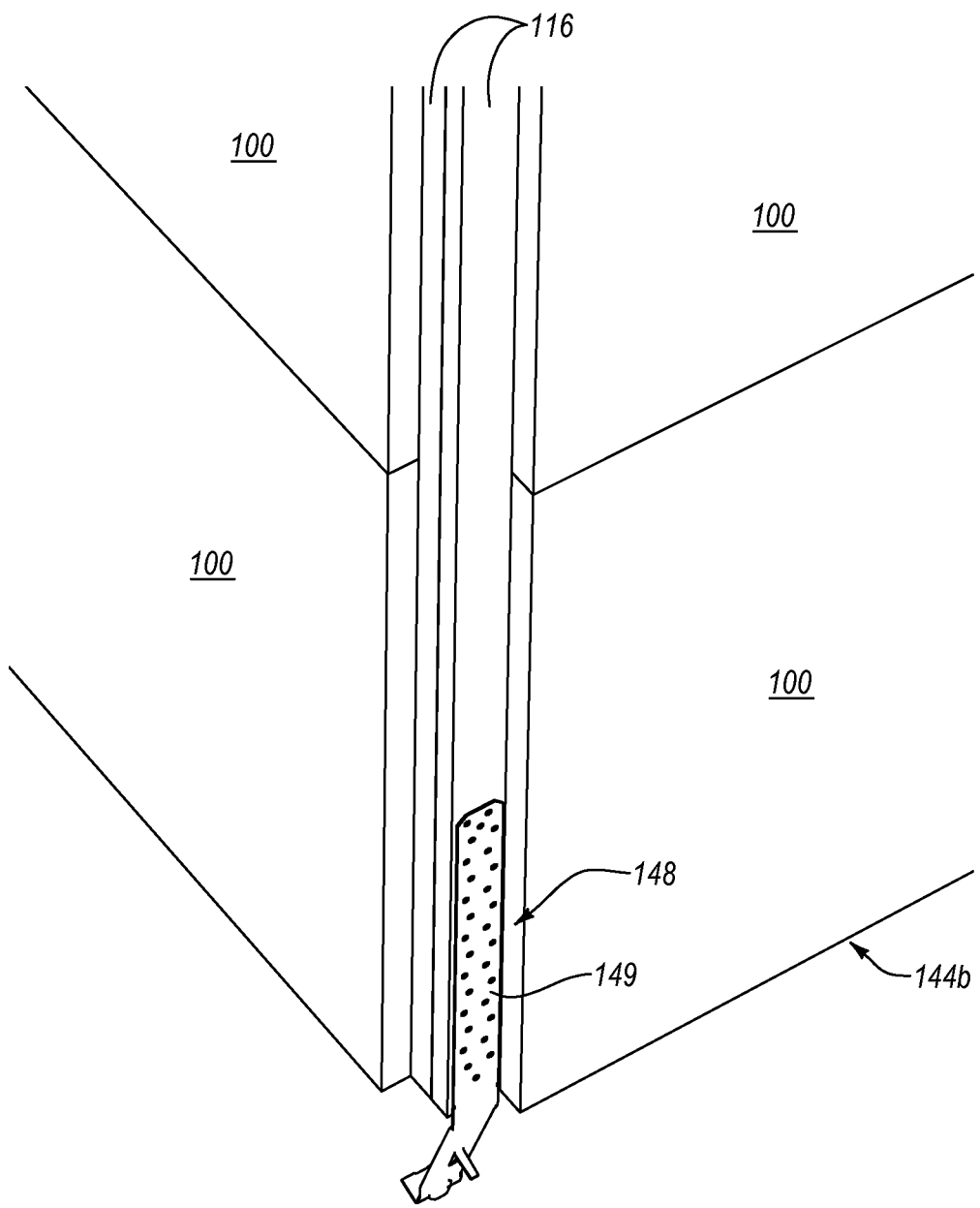
FIG. 13B shows a close up view of a portion of the corner reinforcement of FIG. 13A.

FIG. 13A illustrates another similar corner construction, where walls 144a and 144b come together, without any overlap of the panels, in order to preserve the desired modular characteristics, further illustrating the presence of TJI floor joists 130 that may be used to support a second story floor to the construction, as well as how standard engineering ties 148 may be integrated into the corner construction provided by attached corner splines 116. FIG. 13B illustrates a close up of the lower portion of the corner of walls 144a, 144b, better showing how such an engineering connector 149 may be attached to the corner splines 116.

Figure 14:
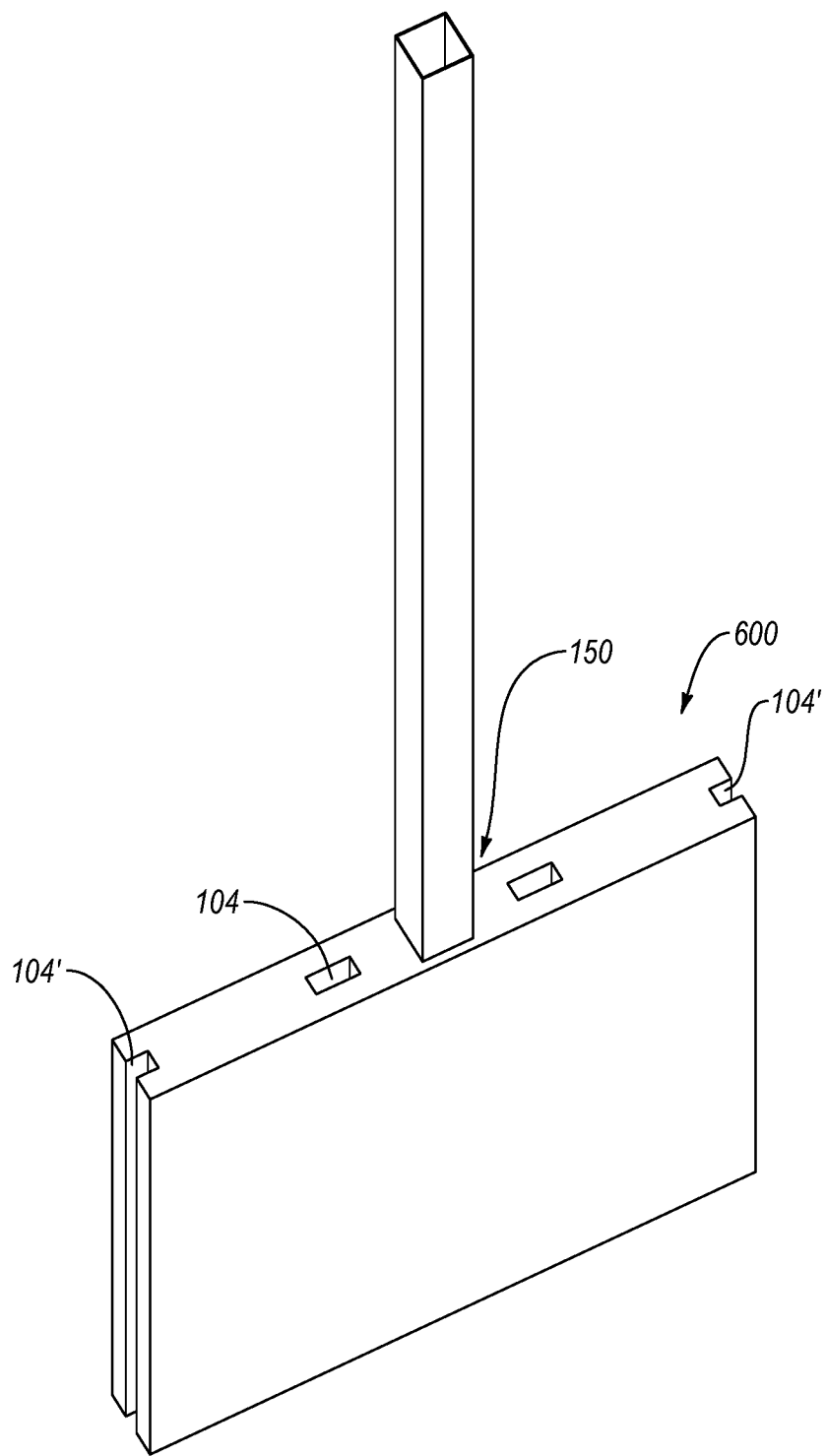
FIG. 14 shows how a modular panel may be configured to receive a structural metal post.

FIG. 14 illustrates how any given panel may be modified or otherwise provided with a high load steel structural post, where engineering requirements dictate such support, as opposed to simply the standard splines 116. For example, such a structural module 600 may simply include an additional channel 150 sized to accommodate insertion of such a structural member 152 therein, in addition to channels 104 and 104' for the standard splines 116 already described herein.

Figure 15:
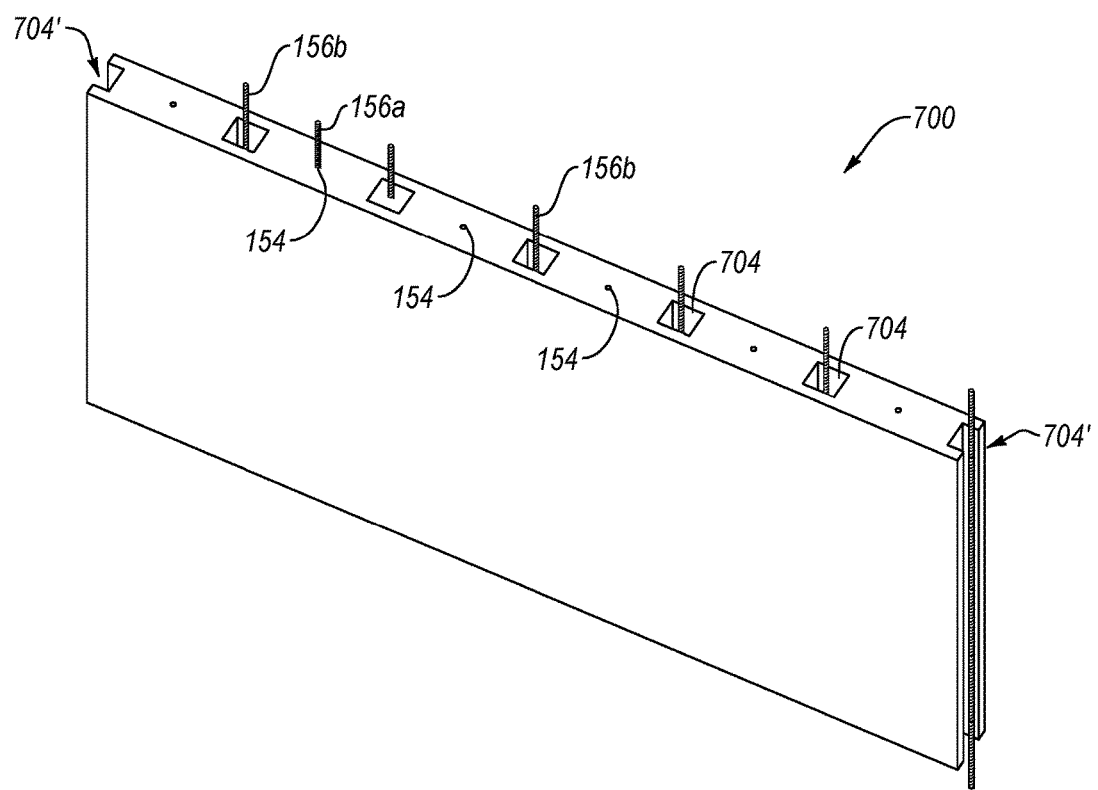
FIG. 15 shows how concrete or another material may be used to fill the channels of the modular panels, e.g., where dimensional lumber may not be available.

FIG. 15 shows an alternative modular panel 700 which may be useful in locations where dimensional splines may not be readily available. As described herein, any material may be used for such splines, dimensional lumber merely being a very convenient example of such. Metal framing members having the same dimensions of such dimensional lumber are also very conveniently employed. Other materials having dimensions corresponding to such dimensional lumber may also be used. It will be appreciated that the actual dimensions of such dimensional building materials (lumber or otherwise) may depend on the locality where construction is occurring. Concrete may be used to fill the channels, serving as the splines, as apparent from FIG. 15. For example, such a panel 700 may include channels 704 and half-size channels 704' analogous to channels 104 and 104'. Rebar alignment channels 154, for receipt of aligning rebar 156 may be provided. In addition, additional rebar 156b may be run within channels 704, 704', which are then filled with uncured concrete, which is subsequently allowed to cure.

Where a building is constructed from such panels, the walls of the building may first be raised, e.g., by stacking panels 700 to form the desired wall "template", with rebar 156a and 156b holding the stacked panels atop one another. With the panels of a wall in position (e.g., vertically), the channels 704 may then be filled with concrete. Once filled with concrete which has cured, such a building construction will be similar to the configurations described elsewhere in the present application, but which include splines 116, rather than poured concrete splines.

FIG. 16 illustrates how the channels 104 of the modular panels 800 may be angled so that the faces of the splines 116 are not parallel (or perpendicular) to the faces of the modular panel 100. Such angling increases resistance to buckling in the panel, and a wall built therefrom. In an embodiment, such rotation or angulation of channels 104, 104' (and splines 116) may be up to 30° (e.g., from 5° up to 30°). That said, it will be appreciated that if desired, full 90° rotation could be used, as seen in the roof panels of FIG. 10, or any rotation up to 90° (e.g., 10°, 20°, 30°, 40°, 50°, 60°, 70°, 80°, 90°). Rotation beyond 90° is of course also possible, all the way up to 180°. FIG. 16 illustrates a rotation of 15° from the configuration seen in FIG. 1. As shown, each successive slot 104, 104' may be rotated in opposite directions so as to best counteract any buckling forces applied to the splines present in such a construction.

FIG. 16 further illustrates how a corner foam member 158 may be cut (e.g., using the same CNC hot wire cutting device) to fit over the splines 116 at a given corner where two or more walls come together. Such a corner foam member may be termed a corner modular panel 158, and may include half size channels on two edges that are adjacent to each other (e.g., 90° apart from one another). It will be appreciated that not all corners need to meet at 90°, where a different corner angle is desired. Corner modular panels may be cut with the CNC hot wire cutting device with any desired angulation to accommodate such needs. Corner modular panel 158 is also shown as including a tie down raceway through which a tie down can be run.

Furthermore, curved walls are also possible, e.g., by providing closely spaced (e.g., 6 inches or less, 4 inches or less, 3 inches or less, or 2 inches or less, such as 1 inch spacing) pre-cut slits into at least one face of the panel that is to be used in forming a curved wall.

Figure 17:
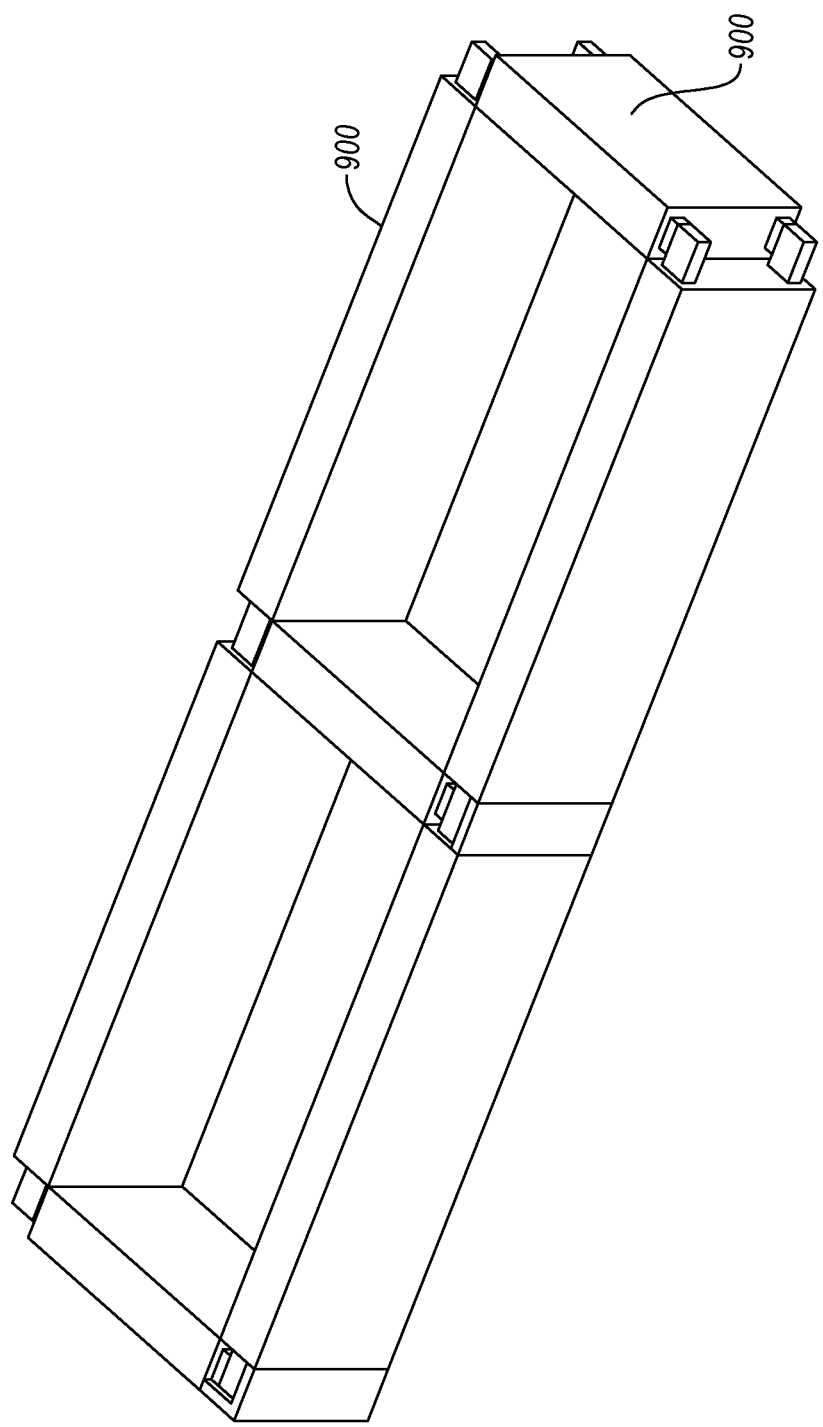
FIG. 17 shows a grow box which may be formed from another modular panel, which also includes channels extending therethrough, and which channels are configured to receive dimensional lumber splines therein.

FIG. 17 shows a grow box which may be formed from a plurality of identical modular panels 900, which are differently configured than other panels shown herein, but which also include channels extending therethrough, and which channels are configured to receive dimensional (e.g., lumber) splines therein.

Figure 18B:
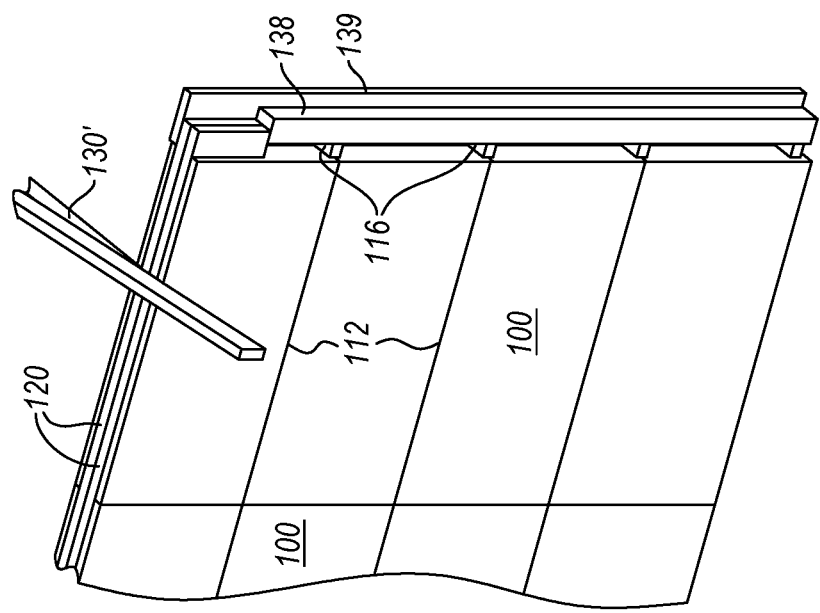
FIGS. 18A-18B show another exemplary wall structure, in which the splines run horizontally through the foam wall panel as in FIG. 7C, have been rotated 90° from the configuration seen in FIG. 7C, for increased flexural strength.
Figure 18A:
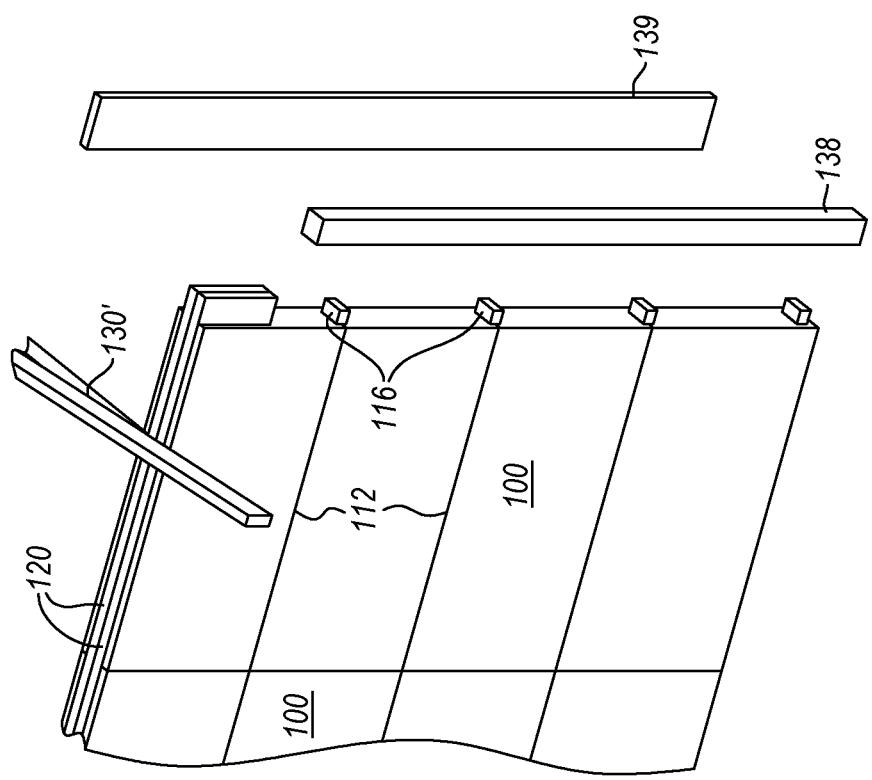

FIGS. 18A-18B illustrate another wall structure, similar to that seen in FIGS. 7C, and 9A-9B, in which the splines 116 run horizontally, rather than vertically through the foam panel 100. Furthermore, splines 116 (and the channels that receive such splines) are rotated 90° relative to the orientation seen in FIGS. 7A and 9A-9B. This orientation provides greater flexural strength to the resulting wall. As shown in FIG. 18B, a post 138 (e.g., dimensional lumber or metal, such as a 4×4). Another dimensional lumber post member 139 can be attached so as to overlap the splines 116, allowing nailing into the splines. Member 139 (e.g., a 2×6 dimensional lumber or similarly dimensioned metal "stud" member) can also be fastened (e.g., nails, screws, adhesive, etc.) to the upright post 138. In such an embodiment, gaps between the foam panel and post 138 may be filled with a sprayable, expandable (e.g., polyurethane) foam material. Filling of such gaps creates a good thermal break. FIGS. 18A-18B thus illustrates another post and beam type wall construction, which will exhibit increased flexural strength due to the orientation of the splines 116.

Splines 116 in FIGS. 18A-18B are oriented so that their longer dimension of their transverse cross-section (i.e., the "4" of a "2×4") nearly spans the thickness of the foam panel 100. For example, for a 5.5 inch foam panel, and using 2×4 dimensional lumber splines (or similarly dimensioned metal splines), the splines will have a transverse cross-section measuring 1.5 inches by 3.5 inches. The 3.5 inch dimension may be centered within the 5.5 inch foam thickness, leaving a 1 inch foam thickness on either side of the spline and the channel within which it is received. This thickness is still sufficient to provide the 1.5 inch minimum between electrical wiring and the exterior of any sheathing (e.g., drywall), where the sheathing is at least 0.5 inch thick (e.g., ⅝ inch drywall may be typical on the interior), so that no enclosure of wiring within protective conduit is required, according to applicable codes.

A strap or any other desired typical connector may be used to attach post 138 to the foundation. While only one member 139 is shown to better illustrate the interior construction, it will be appreciated that the open face shown may also be covered by another member 139, completing the construction of the post which is disposed between adjacent foam panels (e.g., wall panels with horizontal beams, followed by vertical post, followed by another wall panel with horizontal beams . . . ).

Panel 100 of FIGS. 18A-18B may similarly be sized at 8 feet by 4 feet, but illustrates splines placed (and the channels therefore) at 24 inch on center separation, from one to the next. The panel 100 of FIGS. 18A-18B thus includes 4 fractal modules within the panel, rather than 6 fractal modules that would be included, with 16 inch on center spacing. It will be apparent that the panels thus include a whole number of fractal modules therein (e.g., 4, or 6, or 2, or 8, or 3 or 5, etc.).

Once the foam frame has been assembled using the panels as described herein, the structure may be covered with any desired sheathing material. By way of example, interior surfaces may be sheathed with drywall, or any other sheathing material. Because of the visible pre-cut slots 112 on one face and the score lines 112' on the opposite face of the panels, it is easy to see where the splines are located, making it easy to attach drywall or other sheathing into the splines 116, through the 2 inch (or other thickness) foam layer therebetween.

Furthermore, because the exterior of the wall prior to sheathing is formed from a material such as EPS foam that is easily worked, a portable hot wire cutting tool may be used to quickly cut traces or raceways through the foam face, in any configuration desired, for receipt of electrical wiring. Furthermore, current code allows such wiring to not need any conduit, where there is 1.5 inches or more between the exterior of any eventually applied sheathing, and the location of the wiring. The 2 inch foam thickness, coupled with a typical ½ inch or ⅝ inch drywall sheathing allows the wiring to simply be pressed into grooves cut into the foam face during wiring of the building, without the need for any conduit for housing such wiring.

Where the wiring crosses over a spline, a spiked or other metal plate may simply be pressed over the wiring, over the spline, to prevent a fastener from penetrating the wiring, when attempting to fasten into the spline. Such forming of a raceway in the face of the panels can be quickly and easily accomplished after the panels have been raised into the desired wall structures, during wiring of the building. A portable hot wire groove cutting tool can be used for such raceway formation. Such a tool is very quick (e.g., an 8 foot groove length may be formed in a matter of seconds, and the grooves may be freely run over the face of the panels, without regard to spline location, and without passage through any splines (as would be typical in traditional framing). For example, such a groove may simply be "drawn" from a switch or other location to where the power is to be delivered (e.g., a light, outlet, etc.) in a straight line, across the panel face.

In an embodiment, either the interior, exterior, or both foam panel faces of walls of a building may be tiled over with cementitious panels, e.g., such as available from Applicant. Because of the presence of the splines within the channels of the wall system, screws or other fasteners may be used for such attachment. An adhesive may additionally or alternatively be used. Any suitable adhesive may be used to adhere such panels to the foam face. While epoxy or urethane adhesives may be suitable in theory, a polymer modified cement based adhesive may be preferred, as the urethane and epoxy adhesives have been found by the present inventor to be finicky, making it difficult if a user wishes to reposition a panel once it has initially been placed over the adhesive coated foam.

For example, the epoxy and urethane adhesives typically set very quickly, providing little time for the user to perform any needed repositioning or adjustment of a placed panel. Furthermore, because the bonding strength is so great, when attempting to reposition such a bonded panel, chunks of underlying foam may be pulled from the foam frame structure (floor, wall, ceiling, roof, or the like) when attempting debonding, which is of course problematic. A polymer modified cement based adhesive provides greater cure time, allowing some flexibility in positioning, and repositioning, before the bond between the panel and foam frame member becomes permanent and strong. That said, urethane and epoxy adhesives (e.g., foaming adhesives) may also be used, where desired. Methods and other characteristics for such tiling, information relative to adhesives, and the like is found within Applicant's Application Serial No. U.S. patent application Ser. No. 15/426,756 (18944.9), herein incorporated by reference in its entirety. Examples of Applicant's other building systems which may include various features that can be incorporated to some degree herein include U.S. patent application Ser. Nos. 13/866,569, and 13/436,403, also incorporated herein by reference in their entirety.

All components and steps of the method and system can be handled without heavy equipment (e.g., cranes), with the possible exception of any very large, heavy reinforcing structural members that may be embedded in any of the foam modular panel members, or positioned between such panels. In fact, the modular panels are so light as to be easily handled and positioned by a crew of women. For example, the panels (e.g., 4 feet×8 feet) may weigh less than 40 lbs, less than 30 lbs, less than 20 lbs, or less than 15 lbs. Even the splines may be handled and positioned by a crew of women. For example, because there is typically no need to use splines that are of a single piece of continuous material, such crew members could drop scrap material (e.g., scrap 2×4 pieces) into the channels, which scrap material could serve as the splines. As a result, a construction site using such methods may generate very little, if any waste, e.g., far less such waste than is generated when using traditional framing techniques.

While the Figures illustrate construction of simple exemplary walls and buildings to illustrate concepts of the present construction methods and systems, it will be appreciated that the methods and systems may be used to construct a nearly endless variety of buildings.

It will also be appreciated that the present claimed invention may be embodied in other specific forms without departing from its spirit or essential characteristics. The described embodiments are to be considered in all respects only as illustrative, not restrictive. The scope of the invention is, therefore, indicated by the appended claims rather than by the foregoing description. All changes that come within the meaning and range of equivalency of the claims are to be embraced within their scope. Additionally, as used in this specification and the appended claims, the singular forms "a," "an" and "the" include plural referents unless the context clearly dictates otherwise.

What is claimed is:

1. A modular panel for use in constructing a building, the modular panel comprising:
   a body;
   a plurality of channels extending through a length or width of the panel, each channel being configured to receive a spline therein, wherein each spline once received in the channel is disposed within the body, without the spline being exposed on an outside face of the body, so that the spline is restrained once received within the channel;
   wherein the body comprises foam, and the foam body is rectangular in shape, the foam body further comprising a plurality of pre-cut slots in a first face of the panel, each pre-cut slot being centered on a respective channel, extending through the first face into the channel, the foam body further comprising a score line aligned with a corresponding pre-cut slot, on an opposite second face of the panel, such that a thickness of the foam beneath the score line is less than half a thickness of the foam body as defined between the first face of the panel and the opposite second face of the panel.

2. A modular panel as recited in claim 1, wherein the plurality of channels are substantially parallel to one another, and are equally spaced apart from one another.

3. A modular panel as recited in claim 1, wherein the panel is symmetrical along both a length axis and a width axis.

4. A modular panel as recited in claim 1, wherein the channels run parallel to or perpendicular to the faces of the panel.

5. A modular panel as recited in claim 1, wherein the channels are angled from 5° to 30° relative to the panel face to increase buckling resistance of a wall constructed from a plurality of the panels.

6. A modular panel as recited in claim 5, wherein adjacent channels are rotated in opposite directions to better counteract any buckling forces.

7. A modular panel as recited in claim 1, wherein the thickness of the foam beneath the score line is 2 inches or less, so as to be easily cut through with a box knife, and wherein the thickness of the lightweight foam body is at least 5.5 inches.

8. A modular panel as recited in claim 1, wherein the channel has a generally rectangular transverse cross-section, and wherein the channel is oriented so that a length of the rectangular transverse cross-section is oriented parallel to the faces of the foam body.

9. A modular panel as recited in claim 1, wherein the channels are centered between the first and second faces of the foam body.

10. A modular panel as recited in claim 1, wherein the foam body is formed as an integral single piece of material, or as two initially separate halves, each half including one face, where the two separate halves are glued or otherwise attached together.

11. A wall system built from a plurality of modular panels and a plurality of splines, the wall system comprising:
a plurality of modular panels as recited in claim 1; and
a plurality of splines, wherein the splines are received within the channels of the foam bodies of the modular panels, the splines having a length so as to run a length that is greater than the length of the channel of a given modular panel, such that the splines extend through channels of adjacent panels in which the channels of one panel are aligned with the channels of the adjacent panel.

12. A wall system as recited in claim 11, wherein the spline disposed in the channel is not exposed on an outside face of the foam body, such that the spline has only 1 degree of freedom, along the length of the channel.

13. A wall system as recited in claim 11, wherein the wall system comprises a first wall and a second wall, each wall being formed from a plurality of modular panels, and a plurality of splines running through the channels in the modular panels, wherein the first wall only contacts the second wall at adjoining corners of the two walls, so that there is no overlap between the first wall and second wall at a corner intersection thereof.

14. A wall system as recited in claim 11, wherein each wall is perpendicular to the other.

15. A wall system as recited in claim 11, wherein the modular panel is a standard modular panel, the system further comprising a second type of modular panel, wherein the second type of modular panel is a filler modular panel, the filler modular panel including half size channels exposed on either end of the filler modular panel, so as to allow the filler modular panel to be fitted over a spline that is half received into a half size channel formed in an end of the standard modular panel, with the other half of the spline received into the half size channel of the filler modular panel.

16. A wall system as recited in claim 11, wherein the modular panel is a standard modular panel, the system further comprising a second type of modular panel, wherein the second type of modular panel is a corner module including half size channels on two edges that are adjacent to each other.

17. A wall system as recited in claim 16, further comprising a tie down raceway in the corner module through which a tie down can be received.

18. A wall system as recited in claim 11, wherein the wall system is a post and beam type construction, and wherein the modular panels are oriented so that the channels and splines run horizontally and splines extend beyond panels to integrate with an adjacent post positioned between two adjacent modular panels, the splines being connected to the post by a lap joint.

19. A wall system as recited in claim 11, wherein the wall system is a post and beam type construction, and wherein the modular panels are oriented so that the channels and splines run horizontally and splines extend beyond panels to integrate with an adjacent vertical post between two adjacent modular panels, the splines being sandwiched between two members of the vertical post, where the vertical post includes two vertical post members which sandwich the horizontal splines therebetween, forming a sandwich post.

20. A wall system as recited in claim 19, wherein the sandwich post includes at least 3 layers, wherein joints between adjacent horizontal splines occurs at the center of the sandwich post, further comprising blocking in the sandwich post between a given horizontal spline and another horizontal spline that is either above or below the given horizontal spline.

21. A wall system as recited in claim 11, wherein the wall system is a post and beam type construction, and wherein the modular panels are oriented so that the channels and splines run horizontally and splines extend beyond panels to integrate with an adjacent vertical post between two adjacent modular panels, the splines being attached to two members of the vertical post.

22. A wall system as recited in claim 11, wherein the wall system is part of a shed or garden box, wherein the splines run horizontally, and wherein the splines of one wall are connected to the splines of another wall at the corner thereof.

23. A modular panel for use in constructing a building, the modular panel comprising:
a body;
a plurality of channels extending through a length or width of the panel, each channel being configured to receive a spline therein, wherein each spline once received in the channel is disposed within the body, without the spline being exposed on an outside face of the body, so that the spline is restrained once received within the channel;
wherein the body comprises foam, and the foam body is generally rectangular in shape, the foam body further comprising a pre-cut slot in a first face of the panel, the pre-cut slot being centered on a respective channel, extending through the first face into the channel, the foam body further comprising a score line or pre-cut slot in an opposite second face of the panel, aligned with a corresponding pre-cut slot in the first face, such that a thickness of the foam beneath the score line or adjacent the pre-cut slot in the second face is less than half a thickness of the foam body as defined between the first face of the panel and the opposite second face of the panel.

* * * * *